US009166712B2

(12) United States Patent
Marko et al.

(10) Patent No.: US 9,166,712 B2
(45) Date of Patent: Oct. 20, 2015

(54) METHOD AND APPARATUS FOR MULTIPLEXING AUDIO PROGRAM CHANNELS FROM ONE OR MORE RECEIVED BROADCAST STREAMS TO PROVIDE A PLAYLIST STYLE LISTENING EXPERIENCE TO USERS

(71) Applicant: Sirius XM Radio Inc., New York, NY (US)

(72) Inventors: Paul D. Marko, Pembroke Pines, FL (US); G. David Mantel, Boynton Beach, FL (US); Thomas O'Brien, West Palm Beach, FL (US); Richard A. Michalski, Coral Springs, FL (US); Stuart Cox, Boca Raton, FL (US); Mark Rindsberg, Boca Raton, FL (US); Greg Nease, Princeton, NJ (US); Glenn Peffers, Lake Worth, FL (US)

(73) Assignee: Sirius XM Radio Inc., New York, NY (US)

( * ) Notice: Subject to any disclaimer, the term of this patent is extended or adjusted under 35 U.S.C. 154(b) by 307 days.

(21) Appl. No.: 13/838,616

(22) Filed: Mar. 15, 2013

(65) Prior Publication Data

US 2013/0287212 A1    Oct. 31, 2013

Related U.S. Application Data

(63) Continuation-in-part of application No. 13/531,440, filed on Jun. 22, 2012, and a continuation-in-part of application No. 12/735,211, filed on Jun. 22, 2010.

(51) Int. Cl.
*G06F 17/00* (2006.01)
*H04H 20/88* (2008.01)
(Continued)

(52) U.S. Cl.
CPC .............. *H04H 20/88* (2013.01); *H04H 20/74* (2013.01); *H04N 7/20* (2013.01); *H04N 21/4392* (2013.01); *H04N 21/4756* (2013.01); *H04N 21/4825* (2013.01); *H04N 21/4826* (2013.01);
(Continued)

(58) Field of Classification Search
CPC ........ G06F 3/165; H04H 20/28; H04H 60/04; H04H 60/13; H04N 21/4236; G11B 27/34; G11B 27/028; G11B 27/034; G11B 27/038
See application file for complete search history.

(56) References Cited

U.S. PATENT DOCUMENTS 5,973,723 A    10/1999  DeLuca
6,414,720 B1 *  7/2002  Tsukidate et al. ............ 348/469
(Continued)

*Primary Examiner* — Andrew C Flanders
(74) *Attorney, Agent, or Firm* — Kramer Levin Naftalis & Frankel LLP

(57) ABSTRACT

Methods and apparatuses provide personalized radio by outputting selected songs from multiple channels from one or more source streams. Users can specify favorite channels for building their personal playlists, or multiple default playlist channels can be provided by genre or other criteria. User like/dislike inputs via the radio receiver generate filter data used to search all channels for matches or block songs from playback. Filter data can also be based on virtual DJ recommendations. Channel searching for matches involves monitoring real-time song and artist labels or other metadata for all channels carried in a separate data channel. Personalization can also be provided by using filter data to select content from a mixed channel comprising content from a selected group of channels. Connectivity options and web interfaces are provided to facilitate transfer and sharing of customization parameters for personalized radio configuration.

17 Claims, 16 Drawing Sheets

(51) Int. Cl.
  *H04H 20/74* (2008.01)
  *H04N 7/20* (2006.01)
  *H04N 21/439* (2011.01)
  *H04N 21/475* (2011.01)
  *H04N 21/482* (2011.01)
  *H04N 21/61* (2011.01)
  *H04N 21/845* (2011.01)
  *H04H 20/40* (2008.01)
  *H04H 60/91* (2008.01)
  *H04H 60/73* (2008.01)

(52) U.S. Cl.
  CPC ....... *H04N21/6143* (2013.01); *H04N 21/8456* (2013.01); *H04H 20/40* (2013.01); *H04H 60/73* (2013.01); *H04H 60/91* (2013.01)

(56) References Cited

U.S. PATENT DOCUMENTS

| | | | |
|---|---|---|---|
| 6,564,003 B2 | 5/2003 | Marko et al. | |
| 6,588,015 B1 | 7/2003 | Eyer et al. | |
| 6,609,096 B1* | 8/2003 | De Bonet et al. | 704/500 |
| 6,694,316 B1 | 2/2004 | Langseth et al. | |
| 6,876,835 B1 | 4/2005 | Marko et al. | |
| 7,028,082 B1 | 4/2006 | Rosenberg et al. | |
| 7,047,548 B2 | 5/2006 | Bates et al. | |
| 7,058,376 B2 | 6/2006 | Logan et al. | |
| 7,058,694 B1* | 6/2006 | De Bonet et al. | 709/217 |
| 7,116,894 B1 | 10/2006 | Chatterton | |
| 7,343,179 B1 | 3/2008 | Theis et al. | |
| 7,574,513 B2 | 8/2009 | Dunning et al. | |
| 7,720,432 B1 | 5/2010 | Colby et al. | |
| 7,725,919 B1 | 5/2010 | Thiagarajan et al. | |
| 7,831,663 B2 | 11/2010 | Ludwig et al. | |
| 7,848,618 B2 | 12/2010 | Potrebic et al. | |
| 7,941,525 B1 | 5/2011 | Yavilevich | |
| 8,886,753 B2* | 11/2014 | Marcus | 709/217 |
| 2002/0032019 A1 | 3/2002 | Marks et al. | |
| 2003/0014767 A1 | 1/2003 | Stumphauzer, II | |
| 2003/0037117 A1 | 2/2003 | Tabuchi | |
| 2003/0115604 A1 | 6/2003 | Yamamura et al. | |
| 2003/0128774 A1 | 7/2003 | Suzuki et al. | |
| 2003/0135513 A1 | 7/2003 | Quinn et al. | |
| 2003/0163823 A1 | 8/2003 | Logan et al. | |
| 2003/0236843 A1 | 12/2003 | Weber et al. | |
| 2004/0153178 A1 | 8/2004 | Koch et al. | |
| 2004/0266336 A1 | 12/2004 | Patsiokas et al. | |
| 2005/0159122 A1* | 7/2005 | Mayer | 455/179.1 |
| 2005/0249080 A1 | 11/2005 | Foote et al. | |
| 2005/0273833 A1* | 12/2005 | Soinio | 725/113 |
| 2006/0040609 A1 | 2/2006 | Petschke et al. | |
| 2006/0123053 A1 | 6/2006 | Scannell, Jr. | |
| 2006/0212900 A1* | 9/2006 | Ismail et al. | 725/34 |
| 2007/0014536 A1 | 1/2007 | Hellman | |
| 2007/0083901 A1 | 4/2007 | Bond | |
| 2007/0123185 A1 | 5/2007 | Welk et al. | |
| 2007/0192795 A1 | 8/2007 | Kellner et al. | |
| 2007/0256100 A1 | 11/2007 | Jeong | |
| 2007/0277214 A1 | 11/2007 | Kim et al. | |
| 2008/0019371 A1 | 1/2008 | Anschutz et al. | |
| 2008/0092168 A1 | 4/2008 | Logan et al. | |
| 2008/0254751 A1 | 10/2008 | Lazaridis | |
| 2009/0320075 A1 | 12/2009 | Marko | |
| 2010/0268361 A1 | 10/2010 | Mantel et al. | |
| 2012/0066404 A1* | 3/2012 | Evans et al. | 709/231 |
| 2012/0180083 A1* | 7/2012 | Marcus | 725/32 |
| 2012/0184202 A1* | 7/2012 | Gadoury | 455/3.06 |

* cited by examiner

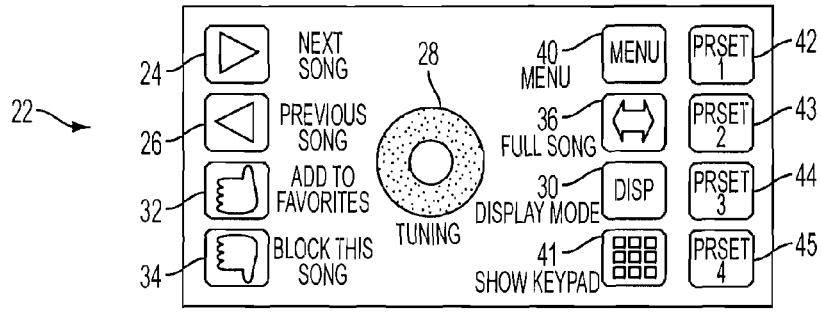
FIG. 6
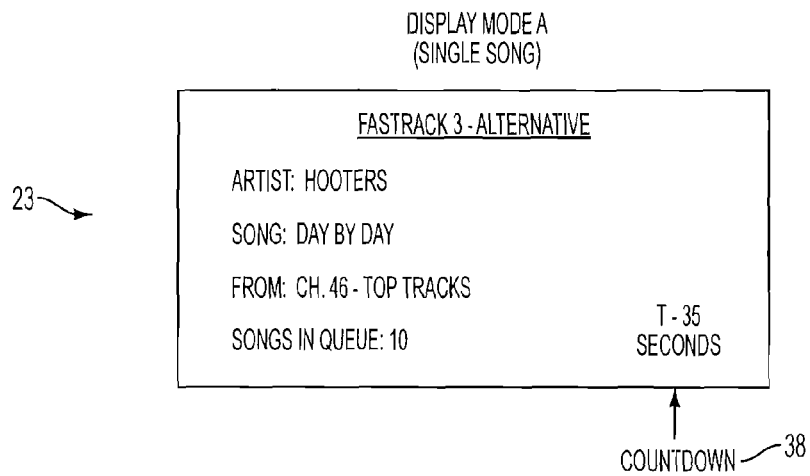
FIG. 7
FIG. 8

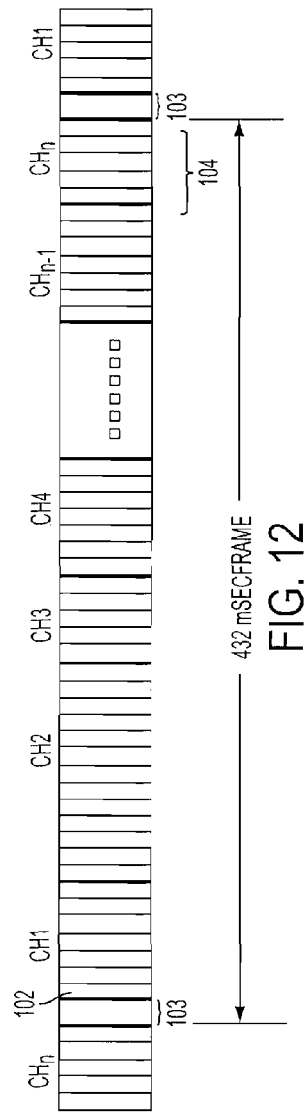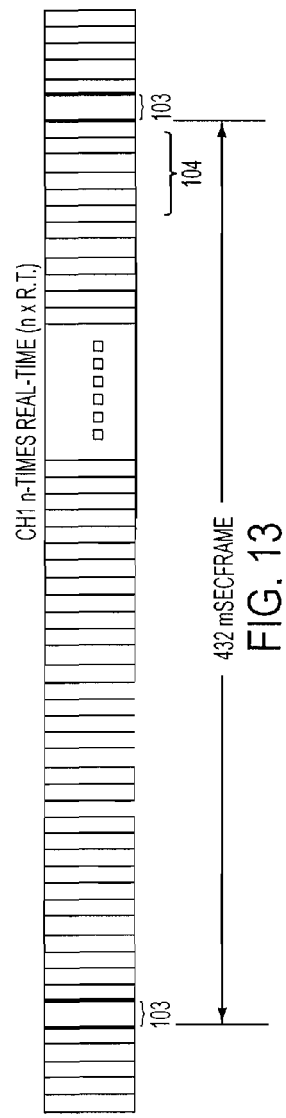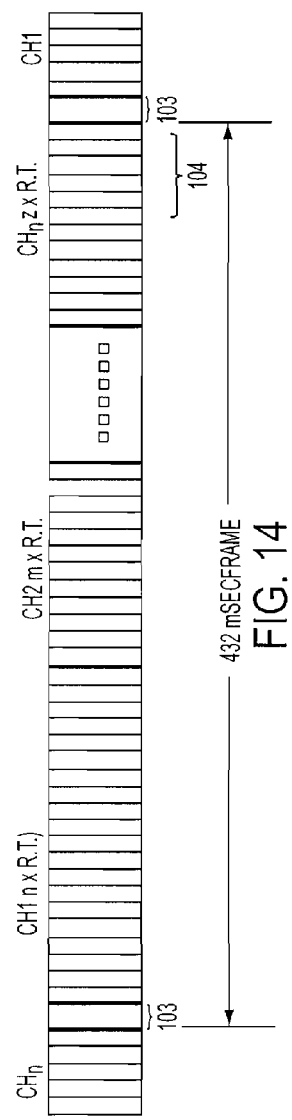

METHOD AND APPARATUS FOR MULTIPLEXING AUDIO PROGRAM CHANNELS FROM ONE OR MORE RECEIVED BROADCAST STREAMS TO PROVIDE A PLAYLIST STYLE LISTENING EXPERIENCE TO USERS

This application is a continuation-in-part of U.S. patent application Ser. No. 12/735,211, filed Jun. 22, 2010 based on PCT/US08/14013, filed Dec. 23, 2008, which claims the benefit of U.S. provisional patent application Ser. No. 61/009,204, filed Dec. 27, 2007, and is a continuation-in-part of U.S. patent application Ser. No. 13/531,440, filed Jun. 22, 2012, which is a continuation-in-art of U.S. patent application Ser. No. 12/213,414, filed Jun. 19, 2008 (now issued as U.S. Pat. No. 8,223,975) and a continuation-in-part of PCT/US2012/25091, filed Feb. 14, 2012; the entire disclosure of each of these applications is incorporated herein by reference.

FIELD OF THE INVENTION

The present invention relates to a system and method for providing a broadcast radio service listener with the ability to generate a personalized radio channel playlist on a radio receiver from broadcast content as it is received. More specifically, the present invention relates to a system and method for buffering content selected from among the broadcast channels of a source stream(s) as they are received, and for generating a playback stream using the buffered content that provides a multi-channel listening experience to the user with customization, preview, reverse, fast forward and other navigation functions for the buffered content.

BACKGROUND OF THE INVENTION

On-line personalized radio service has demonstrated its appeal to music fans as evidenced by the continued growth of personalized radio service providers such as Pandora, LastFM and Slacker. These providers assemble personalized playlists for users by accessing a large music library where each song has a metadata field containing ratings on multiple stylistic parameters. A user inputs a preferred music style, and the provider's system extracts songs from the library for the playlist based on correlation to the song metadata field. Advantageously, users are provided with the capability to accelerate their discovery of new content which is largely aligned with their personal preferences, by skipping over content in the playlist which the user finds uninteresting.

Conventional personalized radio services such as Pandora, however, lack the advantages of exposing users to diverse and professionally curated content delivered by a program service such as a SDARS, for example, as provided by Sirius XM Radio, Inc. For example, SDARS provides a multitude of program channels covering a different types of content (e.g., different genres of music such as rock, country, jazz, classical, among others, a variety of different program channels within each music genre, as well as news, sports, comedy and other types of programming) that is continually researched, discovered, updated and curated (e.g., with disk jockey or "DJ" commentary) by programmers who are knowledgeable with that particular type of content. A need therefore exists for a radio service that is broadcast, streamed or otherwise transmitted to provide updated content and a spontaneous listening experience (i.e., a traditional broadcast experience where a user is surprised by unexpected curated content) with greater opportunity for exposure to new music and other types of content. Further, a need exists for a live broadcast or streamed radio offering with low cost hardware that does not require a large local song database to be built over time at a receiver to enable exposure to content simultaneously transmitted on multiple channels.

Conventional personalized radio services such as Pandora and Slacker enable users to set up different playlists for different genre preferences such as alternative, classical and comedy, but do not provide the capability to mix diverse personal content preferences into a single playlist. For example, conventional personalized radio services do not carry non-music tracks or segments (e.g., comedy tracks) which some users might like in a mixed or blended channel playlist. A need exists for a transmitted programming service that allows the subscriber to select from among the diverse content channels simultaneously transmitted in a programming stream to build a personalized radio channel playlist from both music channels and talk channels (e.g., comedy channels), the content of which is not typically provided in the online libraries of conventional personalized radio service providers. A need also exists to expose users to diverse preferred content in a single continuous playlist without requiring manual interaction or forethought to change playlists or channels.

While satellite radio offers more than 100 channels of audio content, after initially exploring the content offering, subscribers typically narrow their listening choices to 10 or fewer favorite channels, which may be any combination of music and talk channels. For example, a subscriber may prefer listening to popular music and may preset 5 or 6 popular music channels on the radio, along with a comedy channel and news channel. With present radio receiver hardware, the subscriber is limited to listening to one channel at a time and therefore misses the opportunity to be exposed to content simultaneously broadcast on the other favorite channels. A need therefore exists for a satellite digital audio radio service (SDARS)-based personal radio service that provides the subscriber with an option to be exposed to content simultaneously broadcast on multiple channels selected for building a personalized radio channel playlist.

Even with only a subset of channels preferred by user, a provider of diverse curated content such as Sirius XM Radio Inc. can provide users with a spontaneous listening experience (i.e., traditional broadcast experience where a user is surprised by unexpected curated content) and less predictable enjoyment of known and, mostly likely preferred, subset of channels. Such spontaneous enjoyment of diverse, curated content can expose a user to more content of interest than relying solely on user preferences provided on an on-line radio service, for example.

Conventional personalized radio services are disadvantageous in that user interaction with a computer is required to build the personalized playlist. A need exists for a personalized radio services that allows users who enjoy listening to music while driving to build a personalized radio channel playlist using a vehicle-installed radio receiver, thereby personalizing their received programming choices.

The advent of IP point-to-point streaming has enabled the delivery of music channels personalized to likes of each subscriber (Personalized Radio). The traditional broadcast services (point-to-multipoint) are more constrained and better fit for the delivery of a fixed number of music channels from which subscribers can choose from (traditional radio services). The advantage of the broadcast delivery model is typically wider coverage area for less infrastructure cost and bandwidth (when number of users per cell is greater than number of fixed channels). A disadvantage of the broadcast delivery model is the inability to deliver fully personalized channels for each subscriber. With the popularity of IP-based Personalized Radio services, however, there is a desire to also provide some level of personalized radio features over existing broadcast radio services such as SDARS.

A need therefore exists for a broadcast personalization service that allows for personalization when consuming curated program content. Even with channel descriptions of program content based on content genre, for example, and in some cases selected characteristics of content within a channel's genre, users may still prefer some of the curated content on a programmed channel over other content transmitted on that channel. Accordingly, a need exists for a personalization function that allows a guest disk jockey or "DJ" or celebrity or other curator to indicate which content segments they prefer among content segments that are to be transmitted on plural program channels. Users could then select a particular DJ or curator whose tastes in content matches their own and be exposed to content, as well as other program channels, that they may not otherwise have selected or tuned into their receiver.

Further, in the context of IP streaming of transmitted curated content, a need exists for a personalization service or function that allows users to apply their preferences to filter an IP transmitted channel of curated content, and to add customized playlists or filtered content from multiple program channels to create a more personalized, mixed IP streaming program channel from a source of program channels such as the on-line service of a SDARS provided by Sirius XM Radio Inc. or other curated program channel provider.

SUMMARY OF THE INVENTION

Exemplary embodiments of the present invention address at least the above problems and/or disadvantages and provide at least the advantages described below.

In accordance with an exemplary embodiment of the present invention, a method and apparatus (e.g., a receiver) and computer readable code on a computer-readable medium are provided for generating a playlist from one or more received broadcast streams.

In accordance with an exemplary embodiment of the present invention, a source stream comprising audio segments such as songs is transmitted to receivers. Metadata corresponding to each of the audio segments in the source stream is also transmitted to receivers. Filter data is generated at a receiver based on user inputs during playback of the received source stream that indicate preferred ones of the received audio segments. The filter data comprises metadata of the preferred received audio segments that is then used to extract other received audio segments having metadata that correlates with the filter data for generating the playlist.

In accordance with another exemplary embodiment of the present invention, the intelligence to determine what music segments are to be in predetermined playback channel playlist(s) is provided at an uplink device, as opposed to a receiver determining if sufficient correlation exists between transmitted data channel metadata and filter data generated at the receiver based on user inputs.

In accordance with exemplary embodiments of the present invention, at least one of a title, artist and channel identifier for each of the audio segments in the playlist is displayed. A user can be provided with navigation control inputs to scroll forward and backward in the playlist to see the currently stored audio segments, and to select and playback the audio segments in the playlist. A user can also be provided with a user control input to select and store one of the audio segments in the playlist to a favorite song file in a non-volatile memory. In any event, a user can merely tune to the personalized radio channel playlist or Auto Track and listen to the corresponding buffered content, which has been extracted from plural channels in many instances, without requiring any navigation or channel selection if desired.

In accordance with another exemplary embodiment of the present invention, playlist configuration data can be stored comprising at least one of the filter data, and a playlist of audio segments generated using the filter data. The playlist configuration data can be transferred between at least two playback devices.

In accordance with other illustrative embodiments of the present invention, an Auto Track can be based on celebrity or virtual DJ recommendations of content across program channels to be transmitted, thereby providing users with exposure to more diverse content through virtual DJs whom the users share content affinities.

In accordance with other illustrative embodiments of the present invention, mix channels are personalized using filters based on user preferences.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain embodiments of the present invention will be more apparent from the following description taken in conjunction with the accompanying drawings, in which:

FIG. 6 is an exemplary control interface on a radio receiver that provides navigation tools to see playlist song titles on a display and reverse and fast forward through the playlist, preview functions to optionally play shortened segments of each song/segment or the full-length song/segment, and user control inputs to specify favorite or banned items to be included or excluded from playlists in accordance with an exemplary embodiment of the present invention;

FIGS. 7 and 8 are exemplary displays on a radio receiver for viewing playlist information in accordance with an exemplary embodiment of the present invention;

FIGS. 12, 13 and 14 are respective air interface formats for providing a source stream to a radio receiver in accordance with an exemplary embodiment of the present invention;

Throughout the drawings, the same drawing reference numerals will be understood to refer to the same elements, features, and structures.

DETAILED DESCRIPTION OF THE ILLUSTRATIVE EMBODIMENTS

Figure 1:
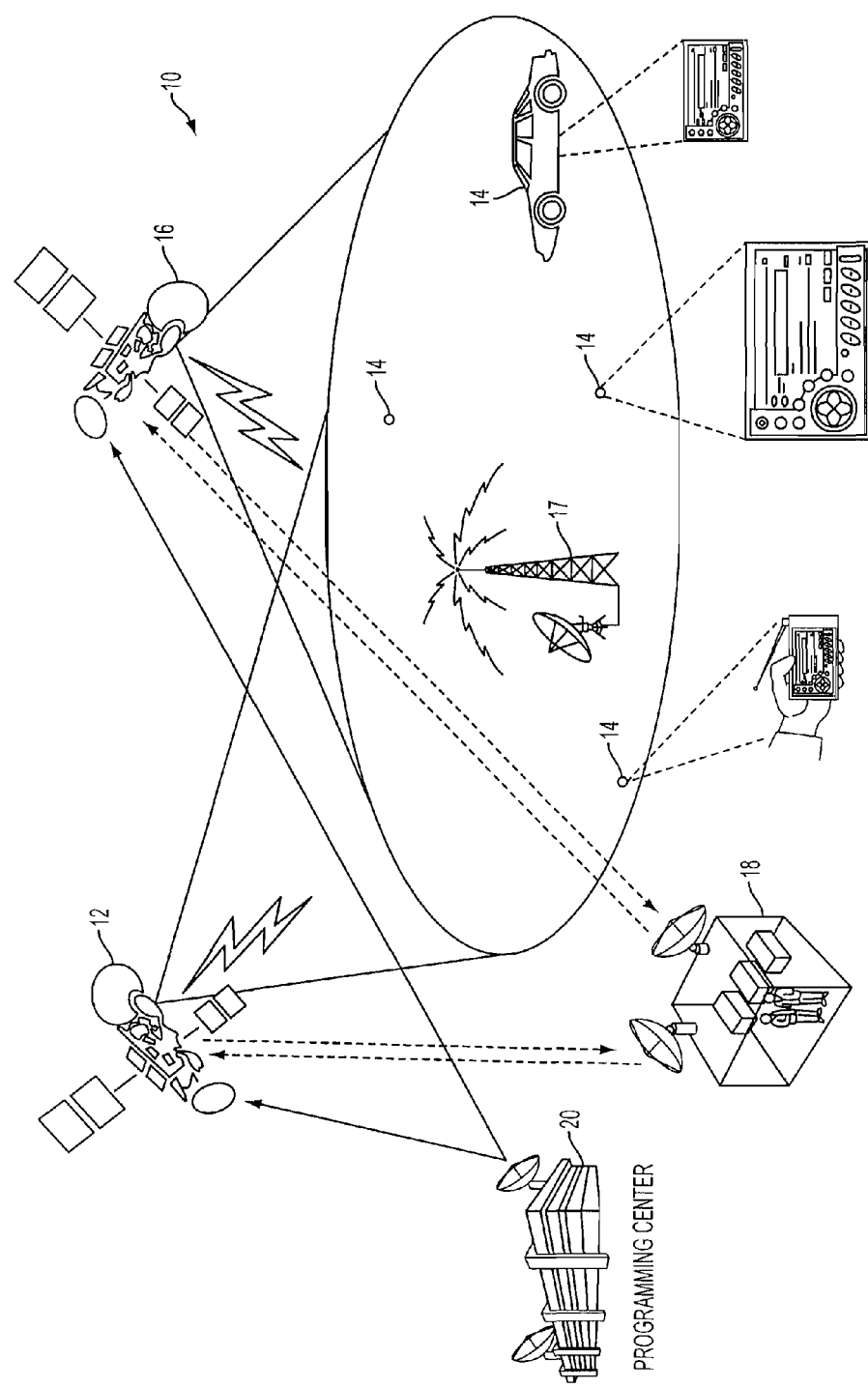
FIG. 1 depicts a multiplexed uplink broadcast transmission system for providing radio receivers with broadcast program channels from which to build personalized radio channel playlists in accordance with an exemplary embodiment of the present invention.

Several exemplary embodiments of the present invention are described herein. Briefly, the present invention provides a radio receiver configured to receive at least one broadcast stream comprising a plurality of different content channels. The radio receiver selects multiple channels from among the plurality of broadcast channels and buffers content from the selected channels as they are received simultaneously via the received broadcast stream(s). The buffered content is used to generate a personalized radio channel playlist that gives a listener a personalized, multiple-channel listening experience.

In accordance with one embodiment of the present invention, the multiple selected channels are pre-selected and stored at the receiver (e.g., plural channels that provide a selected genre of music) to automatically generate a personalized playback channel playlist for the user without the user having to enter specific channels via a user interface on the receiver. In accordance with another embodiment of the present invention, the multiple selected channels are specified by the user (e.g., a combination of favorite music channels and a news channel or comedy channel) via the receiver or another device that interfaces with the receiver. The channels in the broadcast streams can be transmitted at a real-time rate, or can be provided as fast channels that are broadcast at a rate that is n times faster than the real-time rate, which builds a buffer of personalized content at a rate faster than real-time rate.

In accordance with another embodiment of the present invention, audio segments such as music segments on various ones of the plurality of broadcast channels can be selected (i.e., as opposed to predetermined channel selection) and stored at the receiver to automatically generate a personalized playback channel playlist. For example, and as described below in connection with FIG. 19, the source stream can comprise a data channel that broadcasts metadata for each music segment being transmitted on the plurality of broadcast channels in advance of the segments' transmission. A receiver can receive user inputs from which to create filter data that is used to correlate with the received metadata on the data channel. Music segments for which a correlation exceeds a selected threshold are buffered for the personalized playback channel playlist. In accordance with another exemplary embodiment, the intelligence to determine what music segments are to be in the personalized playback channel playlist(s) is provided at an uplink device, as opposed to a receiver determining if sufficient correlation exists between transmitted data channel metadata and filter data generated at the receiver based on user inputs.

In any event, a user can merely tune to the personalized radio channel playlist or Auto Track and listen to the corresponding buffered content, which has been extracted from plural channels in many instances, without requiring any navigation or channel selection if desired. Additional embodiments of the present invention pertaining to buffer management, playlist navigation and management, customization and connectivity features, and content insertion are described below.

Personalized Radio Channel Playlist

The exemplary embodiments are described herein with respect to a satellite digital audio radio service (SDARS) that is transmitted to the receivers by one or more satellites and/or terrestrial repeaters. It is to be understood that the source content stream(s) used to create a personalized radio channel playlist in accordance with the present invention can be broadcast using other content systems (e.g., other digital audio broadcast (DAB) systems or high definition (HD) radio systems), as well as other wireless or wired methods for signal transmission.

FIG. 1 depicts an illustrative system for transmitting at least one exemplary source stream to radio receivers 14. In the illustrative embodiment, the source stream provides SDARS.

FIG. 1 depicts a satellite broadcast system 10 which comprises at least one geostationary satellite 12, for example, for line of sight (LOS) satellite signal reception at receiver units indicated generally at 14. The satellite broadcast system 10 can be used for SDARS, for example. Another geostationary satellite 16 at a different orbital position is provided for diversity purposes. One or more terrestrial repeaters 17 can be provided to repeat satellite signals from one of the satellites in geographic areas where LOS reception is obscured by tall buildings, hills and other obstructions. It is to be understood that different numbers of satellites can be used, and that satellites in other types of orbits can be used.

As illustrated in FIG. 1, a receiver unit 14 can be configured for stationary use (e.g., on a subscriber's premises), or mobile use (e.g., portable use or mobile use in a vehicle), or both. A control center 18 is provided for telemetry, tracking and control of the satellites 12 and 16. A programming center 20 is provided to generate and transmit a composite data stream via the satellites 12 and 16 which comprises a plurality of payload channels and auxiliary information.

With reference to FIG. 1, the programming center 20 is configured to obtain content from different information sources and providers and to provide the content to corresponding encoders. The content can comprise both analog and digital information such as audio, video, data, program label information, auxiliary information, and so on. For example, the programming center 20 can provide SDARS having on the order of 100 different audio program channels to transmit different types of music programs (e.g., jazz, classical, rock, religious, country, and so on) and news programs (e.g., regional, national, political, financial, sports). The SDARS can also provide emergency information, travel advisory information, educational programs, and the like.

Figure 2:
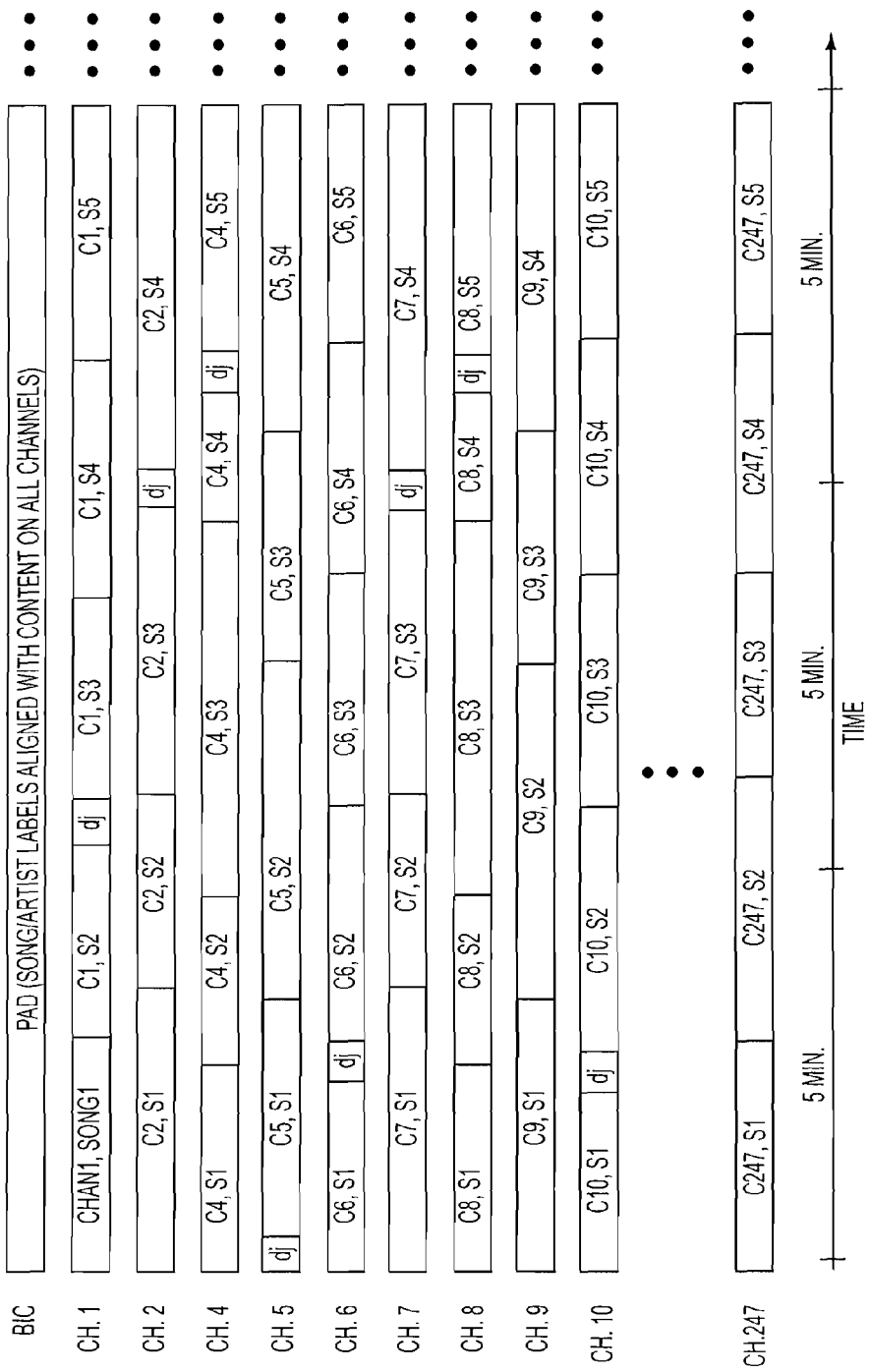
FIG. 2 depicts different program channels in a source stream from which channels can be selected or monitored for favorite content to build personalized radio channel playlists in accordance with an exemplary embodiment of the present invention.

FIG. 2 illustrates different service transmission channels (e.g., Ch. 1 through Ch. 247) providing the payload content and a Broadcast Information Channel (BIC) providing the auxiliary information. These channels are multiplexed and transmitted in a composite data stream that can be a source stream for a radio receiver 14 constructed in accordance with exemplary embodiments of the present invention. The illustrated payload channels comprise segments such as songs indicated, for example, as S1, S2, S3 and so on) and disc jockey (DJ) talk segments indicated as "dj" in FIG. 2.

The BIC includes auxiliary information useful for services selection and non-real-time control. The present invention is characterized by the additional advantages of leveraging this auxiliary information, which is already available in an SDARS composite data stream, for additional beneficial uses. First, the auxiliary information comprises data (e.g., Program Associated Data (PAD) described below) to facilitate locating the beginnings of songs for buffering and locating dj segments for exclusion from the personalized channel. Second, the auxiliary information in the composite data stream (e.g., PAD) allows a multi-channel demultiplexer in the receiver 14 to locate and buffer the selected channels, as well as favorite songs from other non-selected channels. The auxiliary information also allows a multi-channel demultiplexer in the receiver 14 to exclude from the personalized channel any disliked songs identified by the listener. The auxiliary information that relates music genres, channels and songs/artists in an SDARS is therefore a readily available tool with which to navigate the diverse content provided via SDARS for achieving a personalized listening experience. By contrast, extensive metadata must be procured by providers of conventional personalized radio services to enable selection of content for a listener.

More specifically, the BIC can be used to display the station name of available services, a directory to the contents of the composite data stream, as well as PAD. PAD can comprise data associated with a channel such as a song name or label, artist name or label, service ID (SID), and program ID (PID), among other data. The service ID is an identifier (typically 8 bits) which is associated with a specific SDARS provider radio service (e.g., for XM Satellite Radio, the SID can identify service channels such as Top Tracks, CNN News, The Comedy Channel, and the like) and is used identify the specific service channel at the receivers 14. The program ID comprises data relating to the identity of a unique content segment such as a song on a specific CD, for example. Thus, a change in PID and/or PAD can indicate to a receiver 14 the beginning of a song for that channel and facilitate buffering of the song for the personalized radio channel.

The present invention is advantageous since the channels are partitioned into segments, and the beginnings of segments in the multiple selected channels are located for buffering to generate the personalized channel. Thus, complete segments or songs are buffered for playback on multiple, simultaneously received channels that have been selected to create the personalized radio channel playlist. This is in contrast with scanning operations on conventional radios that often bring a listener to the middle or near end of a song that had not been buffered.

Figure 3:
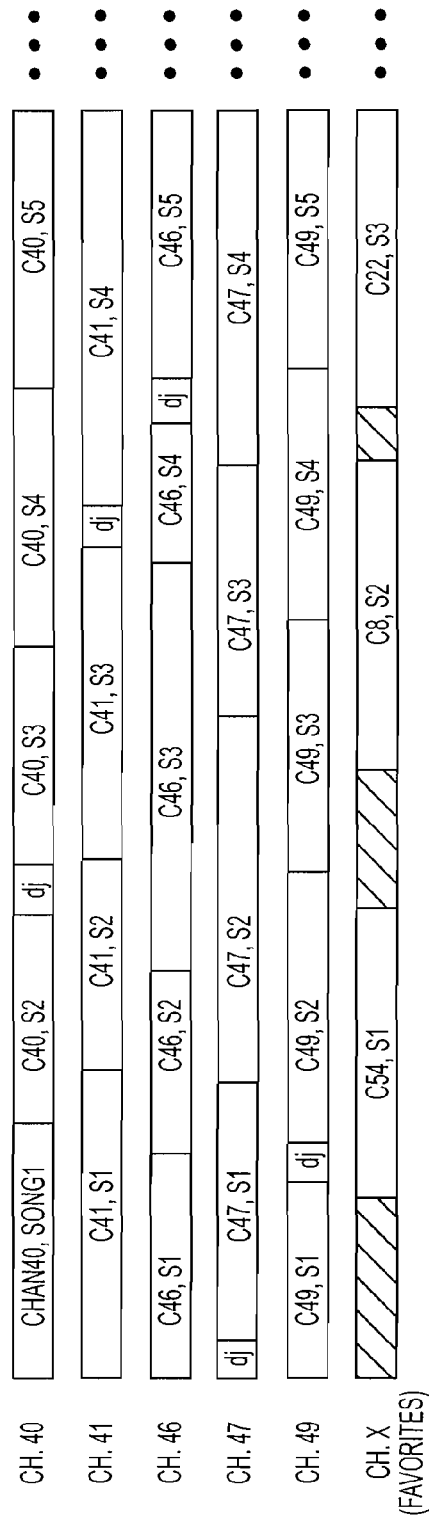
FIG. 3 depicts five exemplary simultaneously broadcast channels (e.g., Ch. 40, Ch. 41, Ch. 46, Ch. 47 and Ch. 49) selected to build a personalized radio playlist and monitored and extracted favorite segments from non-selected channels from one or more source streams for building the personalized radio channel playlist in accordance with an exemplary embodiment of the present invention.

FIG. 3 depicts five exemplary simultaneously broadcast channels (e.g., Ch. 40, Ch. 41, Ch. 46, Ch. 47 and Ch. 49) from one or more source streams. In accordance with an exemplary embodiment of the present invention, the five channels are selected for essentially simultaneous extraction from the received source stream(s) and buffering in a memory 70 (e.g., a static random access memory (SDRAM)) in the radio receiver 14 for creating a personalized radio channel playlist. It is to be understood that a larger or fewer number of channels can be used to create the personalized radio channel playlist.

As stated above, one (or more) of extracted and buffered channels can optionally be a favorite channel. More specifically, the radio receiver 14 is programmed to receive user inputs indicating favorite songs or artists and to save some of the auxiliary information for those songs and/or artists as user favorites data. For example, as described below, a radio receiver 14 can be provided with a Thumbs Up button 32 that a user can depress while listening to a song. The radio receiver 14, in turn, stores user favorites data comprising artist and/or song information obtained from the BIC pertaining to that song. In accordance with an exemplary embodiment of the present invention, the radio receiver 14 monitors the BIC of the received stream(s) for content matching the user favorites data and then extracts and buffers the content for building the personalized radio channel playlist. The monitored channels encompass non-selected channels for the purpose of building the playlist and therefore increase the user's exposure to desirable content in the received source stream to beyond the selected multiple channels.

Figure 4A:
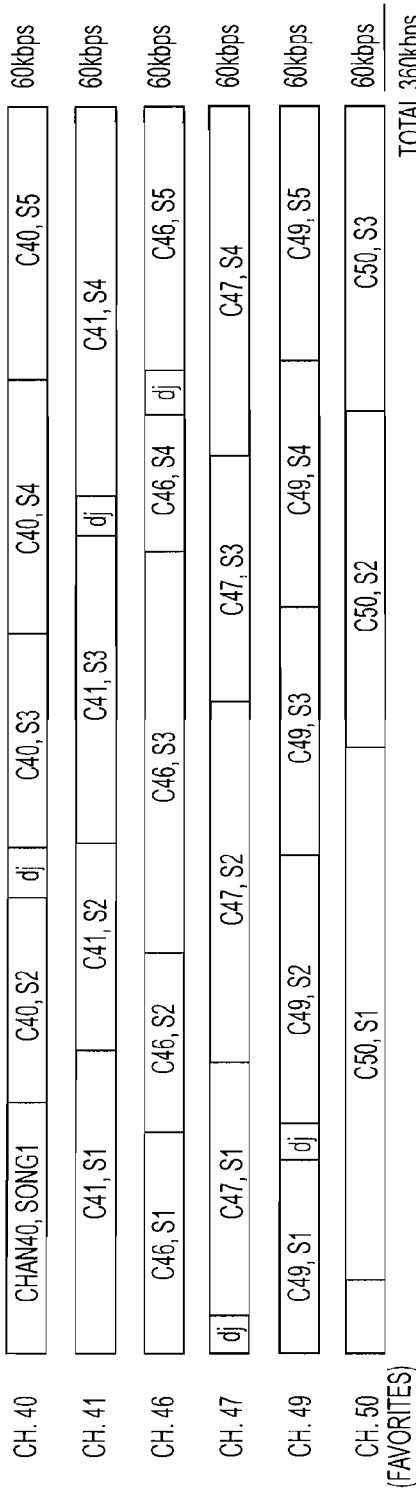
FIG. 4A depicts six selected channels for building a personalized radio channel playlist along with the respective stream bit rate for each channel, which are essentially the same group of channels described with reference to FIG. 3 with the exception of a Ch. 50 being extracted in lieu of implementing a favorites channel (CH. X) in accordance with an exemplary embodiment of the present invention.
Figure 4B:
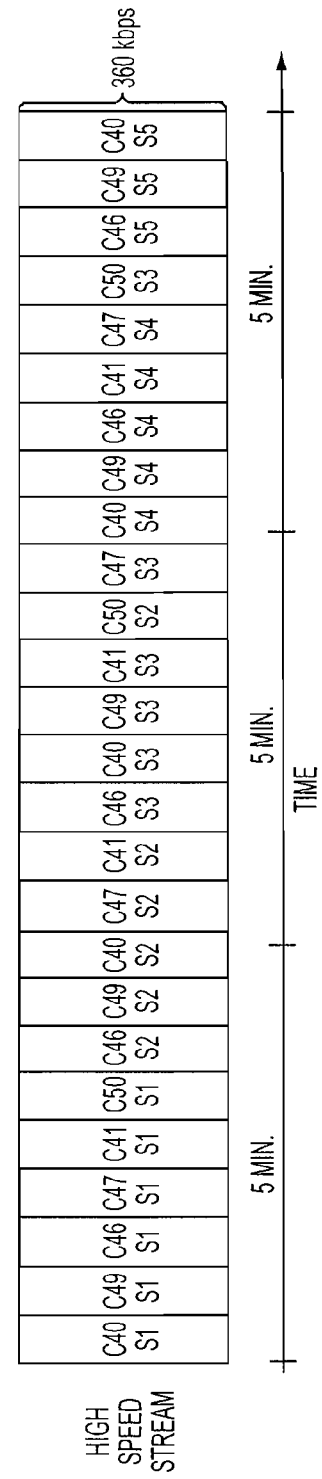
FIG. 4B depicts a high speed stream (e.g., 360 kbps) constituted by songs from multiple channels that are transmitted faster than real-time (e.g., 6 times faster than 60 kbps) in accordance with an exemplary embodiment of the present invention.

FIG. 4A depicts six selected channels for building a personalized radio channel playlist, which are essentially the same group of channels described with reference to FIG. 3 with the exception of a Ch. 50 being extracted in lieu of implementing a favorites channel. With regard to FIG. 4A, a playlist is derived from simultaneous reception of 6 real-time music streams. In the illustrated embodiment, the real-time streams are each 60 kilobits per second (kbps) for a total of 360 kbps of content from which to generate a playlist. Alternatively, the source stream can be a high speed stream (e.g., 360 kbps) constituted by songs from multiple channels that are transmitted faster than real-time (e.g., 6 times faster than 60 kbps), as shown in FIG. 4B.

Figure 5:
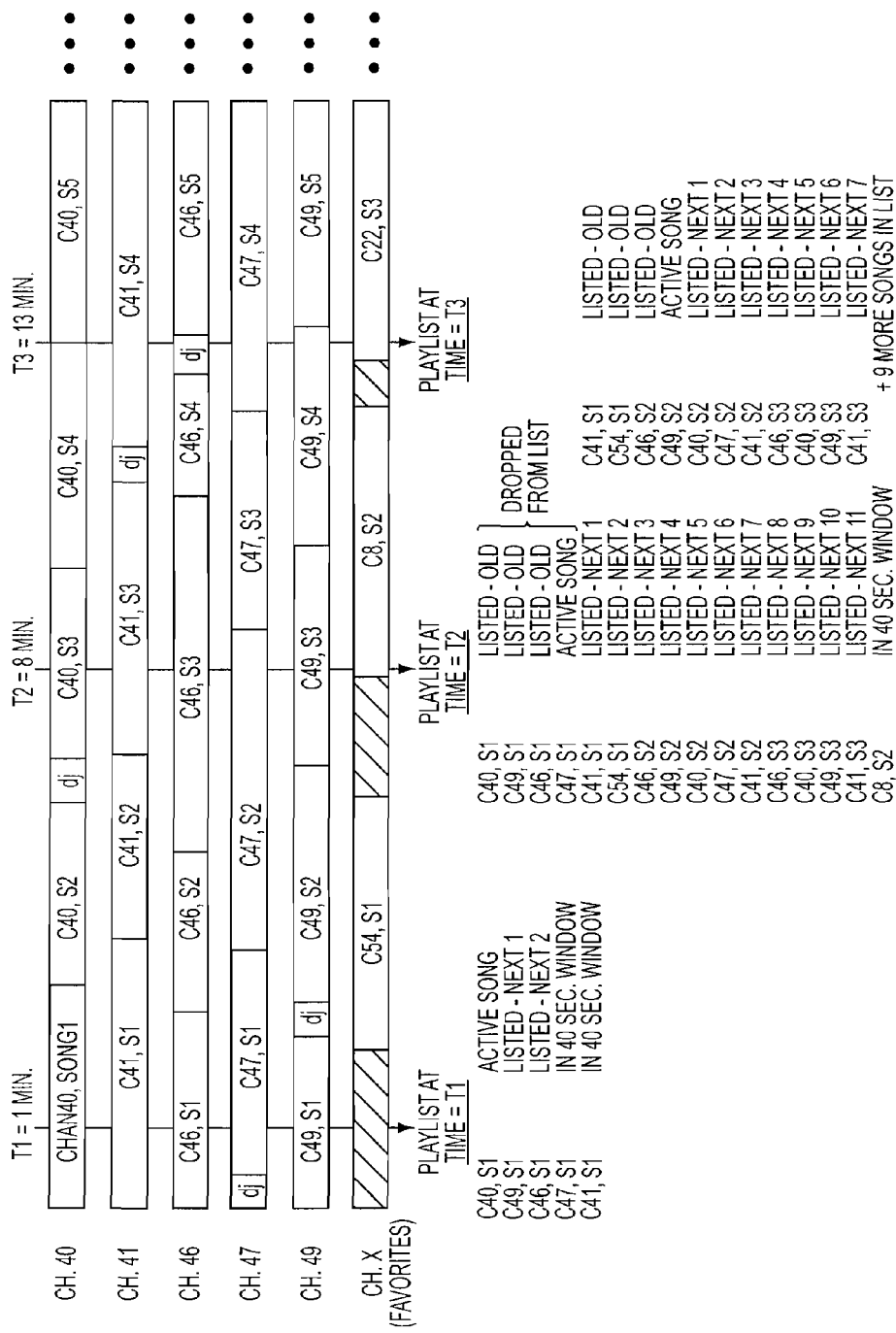
FIG. 5 depicts an illustrative playlist and its constituent selected channels at different times after power up of the radio receiver or selection of a different personalized radio channel configuration in accordance with an exemplary embodiment of the present invention.

In accordance with an exemplary embodiment of the present invention, the personalized channel playlist is generated by time division multiplexing the songs from up to six channels, for example, which enables the playlist to grow faster than real-time. FIG. 5 depicts the playlist at different times after power up of the radio receiver 14 or selection of a different personalized radio channel configuration (e.g., at one minute (T1), at 8 minutes (T2) and after 13 minutes (T3)). The radio receiver 14 preferably monitors the BIC for song or segment changes to locate the beginnings/ends of the songs/segments before buffering. As illustrated in FIG. 5, songs/segments are preferably buffered in the sequential order of their respective start times within the channels being buffered. Further, the radio receiver 14 is programmed to wait a selected time period (e.g., 40 seconds) after the start of a segment before buffering to determine (e.g., from the BIC) whether that segment contains DJ chatter or other content to be ignored and not added to buffer. For example, the radio receiver 14 can be configured to determine that a PAD label for a segment indicates that segment to be a song as opposed to a commercial that is ignored. As shown at time T1, the songs S1 on respective ones of channels Ch. 49 and CH. 46 are listed in sequential order in accordance with their start times following the active Song 1 on Ch. 40. The songs S1 on channels Ch. 47 and 41, however, are preferably not queued in the buffer until about 40 seconds after their start times. Not including short audio segments in the playlist provides one method to remove DJ chatter, commercials or other undesired content.

Assuming that radio receiver 14 start up has occurred or another personalized radio channel configuration has been selected just prior to T1, Song 1 on Ch. 40 has the first start time, followed by Song 1 on Ch. 49 and so on. These songs are preferably buffered by the radio receiver 14 in that order. Thus, at power on, the radio receiver 14 looks for a label change to indicate the start of a song on one of the multiple selected channels and begins building buffered playlist. After power down, the buffer is preferably erased. A flash memory 78 can be used to store buffered playlist segments from the most recent past use for retrieval at power up. A user can switch to another personalized radio channel configuration and start buffering for that selected configuration immediately without a power down operation. The newly buffered segments will overwrite those segments extracted using the previous personalized radio channel configuration.

With continued reference to FIG. 5, the buffered songs that constitute the personalized radio channel playlist are preferably added and dropped on a first-in-first-out (FIFO) basis. As stated above, at playlist start-up (i.e., at power up or initialization of a new playlist configuration, the radio receiver 14 will monitor for the first song/segment with the first start time after start up and then begin building the playlist buffer). As indicated at time T3 in FIG. 5, several of the songs that were available in the playlist at time T2 have been fully or partially played and subsequently dropped at time T3 and more songs have been added.

With reference to FIGS. 6, 7 and 8, the radio receiver 14 provides the user with the tools to see playlist song titles on a display 23, with preview functions to optionally play shortened segments of each song/segment or the full-length song/segment, and user control inputs to reverse and fast forward through the playlist. The exemplary control/user interface 22 depicted in FIG. 6 can be configured as soft keys and/or fixed keys on the radio receiver 14. Two exemplary display screens are depicted in FIGS. 7 and 8, respectively, for providing a single song data display screen and a song list display screen on a radio receiver display 23. The screens depicted in FIGS. 7 and 8 preferably constitute Display Modes A and B, respectively. Both Display Modes A and B provide common information such as the name of the personalized radio channel playlist, the channels from which the playlist content is extracted, playlist song titles and artists, the number of songs in the buffer queue, and the duration of time left before the song currently being played back to the user is changed. The Display Mode A displays the same information regarding the currently playing song in a larger format.

The song list display screen in FIG. 8 lists the song from the personalized radio channel playlist that is currently being played back to the user, as well as the previous song in the buffer and the next few songs in the buffer. The control interface 22 shown in FIG. 6, preferably comprises a next song button 24 and a previous song button 26 for scrolling through the list of songs shown on the song list screen of FIG. 8. Since the number of queued songs may be too large for listing in one display screen, the tuning dial 28 can be programmed to permit a user to change the display of queued songs (e.g., scroll through the next songs in the queue after or before the six songs listed in the screen shown in FIG. 8 depending on which direction the dial 28 is turned).

As discussed in connection with FIG. 5, the playlist is continually changing over time as more songs from the selected channels are added to the buffer and previously buffered songs are dropped from the buffer on a FIFO basis. Thus, the number of songs that can be skipped in the reverse direction on the playlist is limited (e.g., as many a three songs) as these songs are overwritten in the buffer. Nonetheless, the reverse operation of the radio receiver 14 is an improvement over conventional on-line personalized radio services that do not permit reverse or back up operations to play prior items on a generated playlist during preview, nor during full playback without first purchasing the item.

With continued reference to the control interface 22 illustrated in FIG. 6, a display mode button 30 is provided to toggle between the different display mode screens (e.g., between a Display Mode A as shown in FIG. 7 and a Display Mode B as shown in FIG. 8) to display all songs in the buffer or current song being previewed or listened to in full. Buttons are also provided to allow a user to indicate, when listening to a song being played back by the radio receiver 14, that the song should be added to the user favorites data for monitoring and extraction via a favorites channel as described above, or be blocked from being queued in the playlist. Thus, the user can employ the "Thumbs Up" and "Thumbs Down" buttons 32, 34 to build a filter using customer-created lists of favorite songs or artists when generating a personalized radio channel playlist at the radio receiver 14.

In order to expose the user to each song being played on the subset of channels in the currently selected personalized radio configuration, songs or talk segments in the buffered playlist are truncated in order to reduce the average time each segment is played. For example, if the playlist has grown to 10 or more songs, each new song may be played for 45 seconds and then terminated so that the next song in the playlist can start. During the song, the user has the option to listen to the full song or back up in the playlist to listen to a previous song. A button 36 is provided to enable a user to select playback of a full-length version of the currently playing song. The user may be provided with an audible alert around 5 or 10 seconds before a song is terminated as a reminder to select playback of the full length version if desired. A user can opt to play full-length versions of all songs in the playlist but would either lose buffered content that is replaced with new content before being previewed or lose new content that could not be buffered when the buffer is full, depending on the buffer management implementation. When playing the full length version of the song, the user may optionally save the song to a separate favorite song file in non-volatile memory (not shown).

As shown in FIGS. 7 and 8, the amount of time left in a currently playing song (i.e., for preview or full length playback) is provided as a countdown timer 38 on the display 22 to inform a user of the time remaining before the current song is truncated and playback of the next song in the queue begins.

As described in more detail below, an algorithm for the countdown timer 38 can be a phase locked loop to ensure a selected number of songs remain in the buffer. For example, timer 38 can be speed up (e.g., less preview time per stored segment) when the buffer has grown to a selected amount or the number of channels used to create the personalized radio channel has increased (e.g., using 10 channels instead of 5), or slowed down (e.g., more preview time per stored segment) when a selected number of Fast Forward operations have occurred. This countdown function 38, which truncates the songs in the playlist for preview purposes, may be enabled and disabled by the subscriber.

For example, once the number of "next songs" (e.g., see songs queued after an active song in FIG. 5) in the buffer builds to a predetermined number of songs (e.g., 10 songs), the countdown timer 38 in the radio receiver 14 is initiated. If the number of channels is 5 and the average song is 3.5 minutes, the initial value of the countdown timer can be 210 seconds/5=42 seconds. This value may be set to a predetermined or otherwise fixed value or, as discussed previously, increased and decreased as the number of next songs in the buffer decreases or increases above or below predetermined thresholds. The time value is adjusted in order to maintain a predetermined number of next songs in the buffer.

In order to stop occasional repetition (e.g., buffering the same song being played on different channels), a duplicate filter can be deployed in accordance with an exemplary embodiment of the present invention. Each time a song is listed in the playlist, the same song is added to a blocked song list stored in the radio receiver 14 for the next 10 songs or other predetermined number of songs. This insures at least 10 different songs are presented in the playlist between any 2 repeated songs.

With continued reference to FIG. 6, a menu button 40 provides a user with other functions such as, for example, a purchase button for initiating a transaction to acquire a song in the playlist. The exemplary control interface 22 depicted in FIG. 6 can also have PreSet keys 42, 43, 44, 45 for selecting channels for individual playback or for selecting other multichannel configurations. A Show Keypad button 41 can also be provided to display numeric soft keys to provide a user with a convenient method of entering numeric information such as a desired channel number.

As stated above, an exemplary embodiment of the present invention uses selected content from a broadcast stream (e.g., satellite or terrestrial delivery) based on personalized settings to build a local personalized content database, that is, a user selects multiple channels from among all of the channels that are broadcast simultaneously in a source stream for simultaneous buffering in a personalized radio channel playlist in a radio receiver 14. Thus, a user is exposed to the content on the multiple channels as it is received.

Another embodiment of the present invention provides for the autogeneration of a personalized radio channel playlist based on selection of one of several offered genre-based multiple-channel personalized radio configurations. For example, the different genre-based multi-channel personalized radio configurations can be broadcast in a control data channel that is separate from the individual audio channel streams, where each configuration includes a list of individual channels for the radio receiver 14 to simultaneously extract. These preset configurations are presented to the subscriber as special "fast track" channels, such that the subscriber can "tune" to them without requiring additional interaction. A user can change between personalized radio configurations and the radio receiver 14 will immediately commence buffering based on the channels in the newly selected personalized radio configuration without requiring a power down operation.

In addition, an embodiment of the present invention allows a user to select which channels are to be included in a customized personalized radio configuration as opposed to using a preset configuration. One of the selected channels in the configuration can be a favorites channel, that is, songs or segments that are extracted from non-selected channels because they have been identified by the user as a favorite (e.g., using the thumbs up button 32 during a previous reception of the song or segment) and stored in a favorites list at the radio receiver 14. The radio receiver 14 is also configured to allow users to specify their favorite channels for building personalized radio channel playlists.

Figure 9:
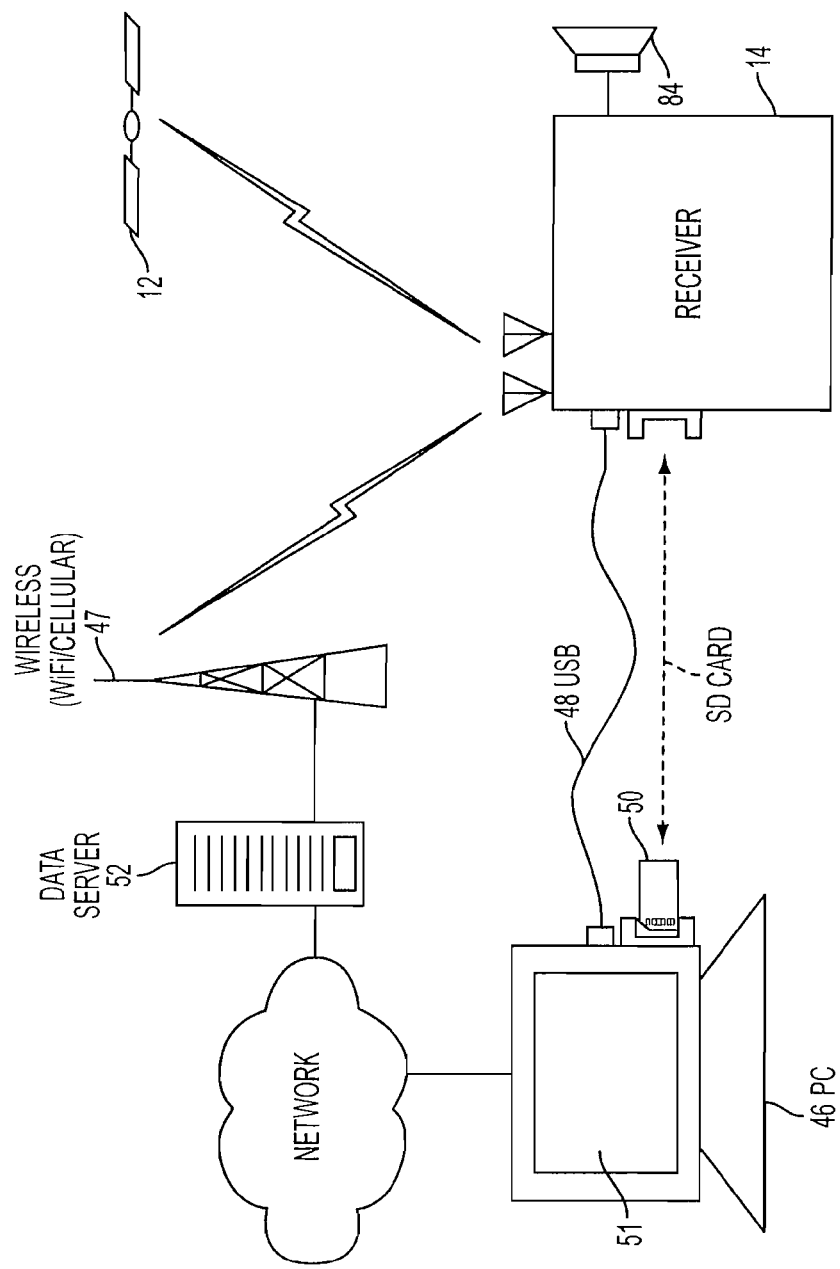
FIG. 9 depicts different optional methods for connecting a radio receiver having a multi-channel memory for buffering personalized radio channel playlists to other computing devices in accordance with an exemplary embodiments of the present invention.

Users have the options of entering favorite song/segment and/or channel information via the user interface 22 on the radio receiver 14 or via a personal computer 46 to which the radio receiver 14 can be connected in accordance with other embodiments of the present invention that facilitate customization of personalized radio channel configurations and sharing of customized playlist building configurations and favorites information (e.g., with friends and family members who enjoy similar broadcast content and may want to build similar personalized radio channels). With reference to FIG. 9, a radio receiver 14 having a multi-channel memory for buffering a personalized radio channel playlist is shown connected to a computing device 46 (e.g., a personal computer (PC)) using a number of different methods. The radio receiver 14 can transfer personalized radio channel configurations, lists of favorite channels, lists of favorite or banned songs and other multi-channel customization parameters to the computing device and receive similar information therefrom using one or more of these methods.

For example, a direct USB connection 48 can be provided between the radio receiver 14 and the PC 46. This is particularly useful if the radio receiver 14 is portable. A radio receiver 14 that is a dedicated car-installed unit can have a removable flash memory card 80 (e.g., a micro SD card) on which customized personalized radio configuration information is stored and corresponding interface. The micro SD card can then be used with a PC 46 or other car-installed radio receiver 14. Further, wireless technology 47 such as WiFi, WiMax and cellular interfaces can be used to call a radio receiver 14 with customized personalized radio information, and to scan and receive the configuration information for uploading through the wireless-enabled radio receiver 14 to a PC 46 or other player. The radio receiver 14 can optionally be connected wirelessly to a server 52. The channel configurations can be transferred or synchronized between the PC 46 and the radio receiver 14 as needed.

Figure 11:
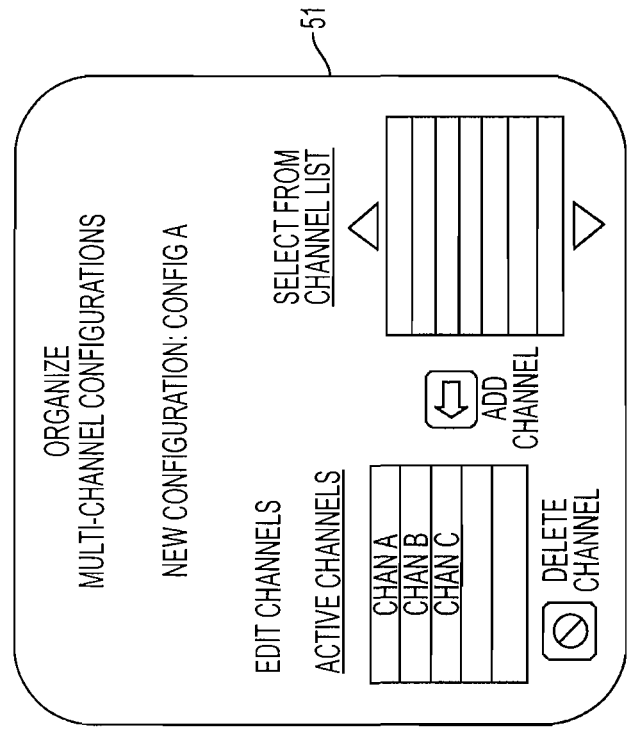
FIGS. 10 and 11 are illustrative web interface window for customization of personalized radio configuration parameters in accordance with an exemplary embodiment of the present invention.
Figure 10:
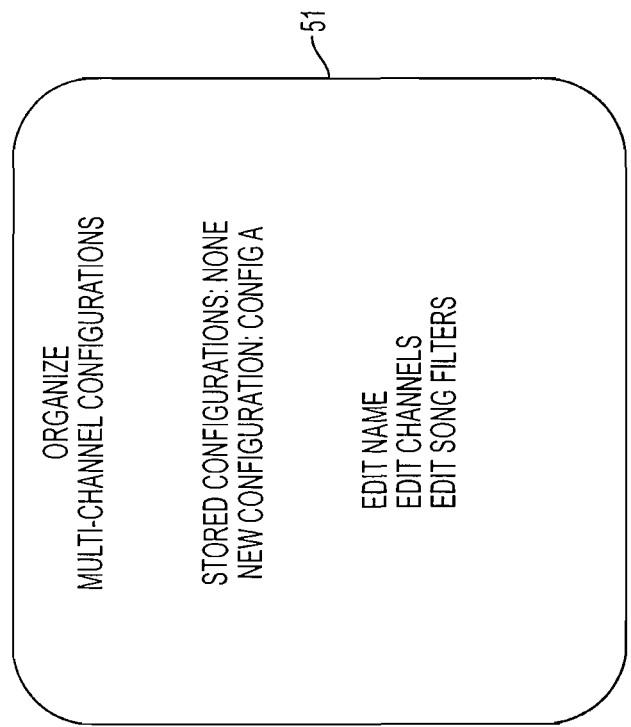

In accordance with another embodiment of the present invention, a web interface can be provided with user screens to allow users to create configurations and lists of favorite artists and songs for building a personalized radio channel that can be transferred to a device using, for example, a direct USB interface 48 or microSD card 50 or other portable memory device. FIGS. 10 and 11 are exemplary PC multichannel customization screens or a PC display 51. FIG. 10 depicts a "Main Configurations" window that lists any currently stored personalized radio channel configurations and options for creating a new configuration (e.g., edit name, edit channels that constitute the new configuration, and edit song filters). FIG. 11 is an "Edit Channels" window that is displayed when the Edit Channels option is selected in the window depicted in FIG. 10. Active channels can be selected from a scrolling channel list that can include all broadcast channels in a source stream or favorite channels stored in the radio receiver 14. It is to be understood that other source streams can be selected from which channels can be selected and added to the active channels list.

An "Edit Song Filters" window (not shown) can be displayed when the Edit Song Filters option is selected in the window depicted in FIG. 10. The "Edit Song Filters" window is similar to the "Edit Channel" window in FIG. 11 in that the user may select specific songs or artists from a comprehensive list to add to either the "Favorites List" or the "Do Not Play List". As described above, the "Favorites List" is used for a background scan of all non-selected channels and, if a match is found, that song or artist is extracted and added to the playlist. The "Do Not Play List" filters the listed songs or artists out of the playlist.

In accordance with another embodiment of the present invention, the web interface 46 can be used to provide listener's audit information to the programming center 20. For example, patterns of listeners can be determined based on their selected configurations (e.g., music-genres, thumbs up/down operations 32, 34 and corresponding favorites and banned segments lists) which can be uploaded from their PCs 46 to the programming center 20 or other central location (e.g., data server 52) via the web (e.g., a wired or wireless IP connection as indicated by the PC 46 connected to a network, or wireless transmission 47 such as WiFi or cellular, as shown in FIG. 9).

As stated above, the present invention allows users to build personalized radio channel playlists from selected channels in one or more broadcast source streams such as an SDARS transmission. FIG. 12 depicts an exemplary over-the-air protocol frame format for an illustrative source stream in which the payload channels and auxiliary information channel(s) are multiplexed for transmission to receivers 14. This frame format is based on a 432 millisecond frame where each frame includes a frame header 103 and is subdivided into 8 kilobit per second sub-channels 102. These sub-channels 102 can be dynamically grouped to form higher bit rate payload channels 104 (i.e., Channels 1 through n which may include the BIC). The payload channel 104 provides the necessary bandwidth to transport a high-quality digital audio signal to the listener. When a listener changes program channels on a receiver 14, the receiver 14 extracts a different payload channel 104 corresponding to that program channel from each frame.

FIGS. 13 and 14 depict respective exemplary embodiments for additional air interface formats. FIG. 12 illustrates a time division multiplex of multiple real-time audio streams. FIG. 13 depicts an air interface for a single channel (e.g., Ch. 1) audio stream that is transmitted faster than real-time. FIG. 14 depicts an air interface for multiple single channel audio streams that are transmitted faster than real-time (e.g., Ch. 1, Ch. 2, ..., Ch. n that are transmitted, respectively at rates n, m, ..., z times faster than real-time). As described in connection with FIGS. 4B and 5, a channel transmitted using either of the air interface formats depicted in FIGS. 13 and 14 builds a personalized playlist more quickly that the air interface format depicted in FIG. 12.

Figure 15:
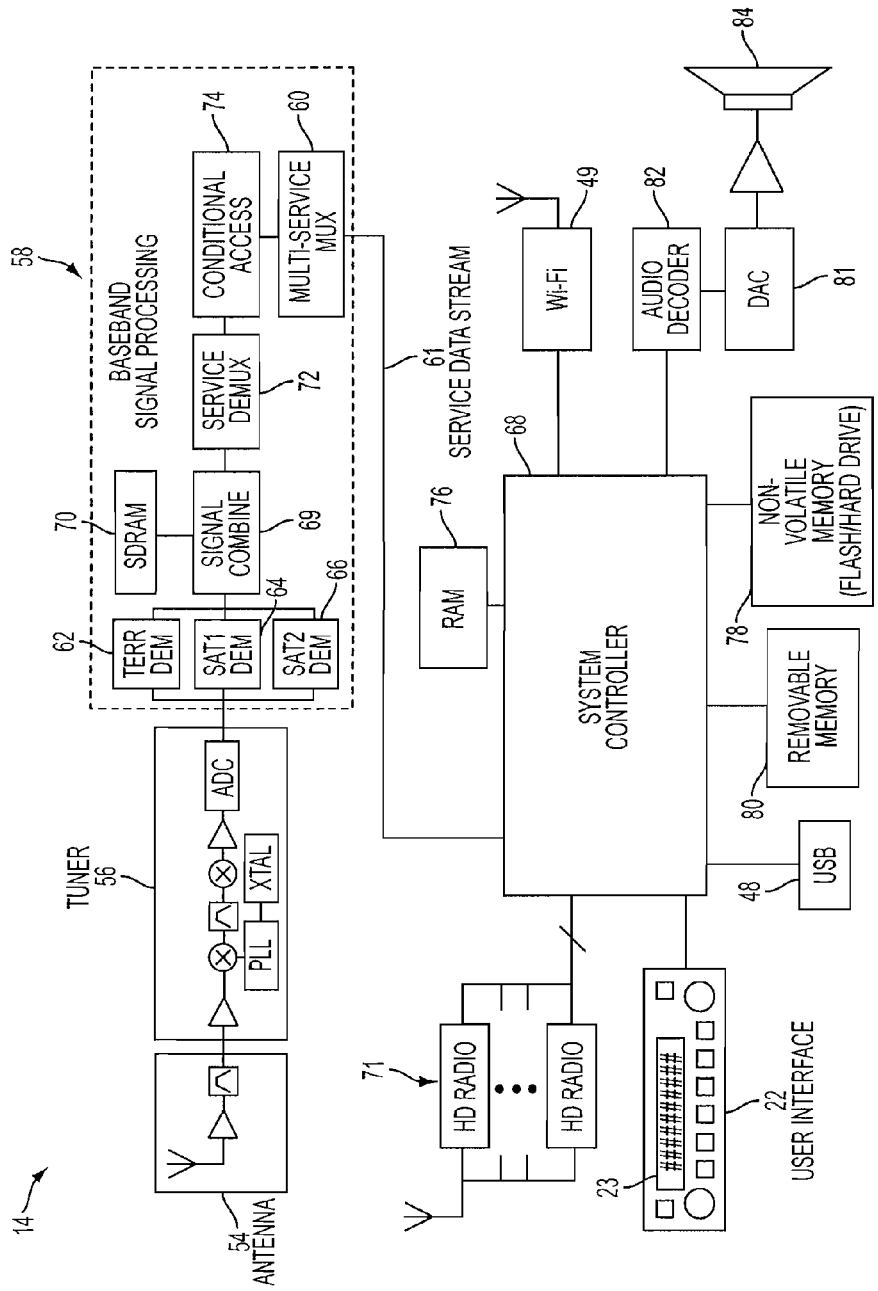
FIG. 15 block diagram of a receiver in accordance with an exemplary embodiment of the present invention.

An exemplary receiver 14 is depicted in FIG. 15. The radio receiver 14 preferably comprises an antenna 54 for receiving, for example, an SDARS signal and/or other broadcast streams, a tuner 56, baseband signal processing components indicated generally at 58, a system controller 68, a multi-service multiplexer MUX 60 and memory, among other components.

With further reference to FIG. 15, the receiver 14 preferably comprises three receiver arms for processing the SDARS broadcast stream received from two satellites 12, 16 and a terrestrial repeater 17, as indicated by the demodulators 62, 64, 66, that are demodulated, combined and decoded via the signal combiner 69 in combination with the SDRAM 70, and demultiplexed to recover channels from the SDARS broadcast stream, as indicated by the signal combining module 69 and service demultiplexer module 72. Processing of a received SDARS broadcast stream is described in further detail in commonly owned U.S. Pat. Nos. 6,154,452 and 6,229,824, the entire contents of which are hereby incorporated herein by reference. A conditional access module 74 can optionally be provided to restrict access to certain demultiplexed channels. For example, each receiver 14 in an SDARS system can be provided with a unique identifier allowing for the capability of individually addressing each receiver 14 over-the-air to facilitate conditional access such as enabling or disabling services, or providing custom applications such as individual data services or group data services. The demultiplexed service data stream 61 is provided to the system controller 68 from a multi-service multiplexer 60. In accordance with an embodiment of the present invention, the radio receiver 14 is provided with a memory (e.g., RAM 76 or 78) or a part of a memory that is a multi-channel memory for buffering the selected received and demultiplexed channels of the currently active personalized radio channel configuration.

The RAM 76 connected to the system controller 68 in FIG. 15 is used for buffering. Also, the system controller 68 may be enabled to provide a second level multiplexer to multiplex content from the satellite multi-service multiplexer, an HD receiver bank 71, a WiFi link 49, removable memory 80 and/or the non-volatile memory 78. Some specific examples include building the playlist from (1) one or more high speed HD radio stream(s), (2) multiple real-time HD radio streams, (3) a combination of high speed and real-time HD radio streams, (4) a high speed WiFi stream, (5) a combination of satellite radio stream(s), HD receiver stream(s), WiFi stream(s) and other wireless streams, or any of the previous source stream configurations in combination with locally stored content segments.

With further reference to FIG. 15, the system controller 68 receives a service data stream 61 from the multi-service MUX 60 and can provide selected, demultiplexed audio, speech and the like to an audio decoder 82 and digital to audio converter (DAC) 81 for playback via a speaker 84. The selected content can be based via user inputs to a user interface 22 as shown. The user interface 22 comprises a display 23 and input devices (e.g., buttons, dials) for selecting received program channels for playback and navigating buffered content in the playlist. For example, a user can opt to select one of the received channels for playback in a default playback mode, or select a personalized radio playback mode and use the display and buttons described with reference to FIGS. 6-8 to navigate and listen to segments from multiple buffered channels available in the playlist stored in the SDRAM based on the current personalized radio configuration.

With continued reference to FIG. 15, the radio receiver 14 can have a USB port 48 to allow settings and other operating data to be transferred between another device and the receiver 14 such as personalized radio multi-channel customization parameters as described above. A removable memory 80 and interface can also be provided such as a micro SD card to allow also transfer personalized radio multi-channel customization parameters, or a cartridge on which other buffered content is stored (e.g., acquired content, MyMusic content) for playback when reception of the live source stream is not available as described in commonly-owned U.S. patent application Ser. No. 11/239,642, filed Sep. 30, 2005. Finally, non-volatile memory 78 and random access memory 76 are preferably provided in the radio receiver 14 for use by the system controller 68 (e.g., for storing program code).

Figure 16:
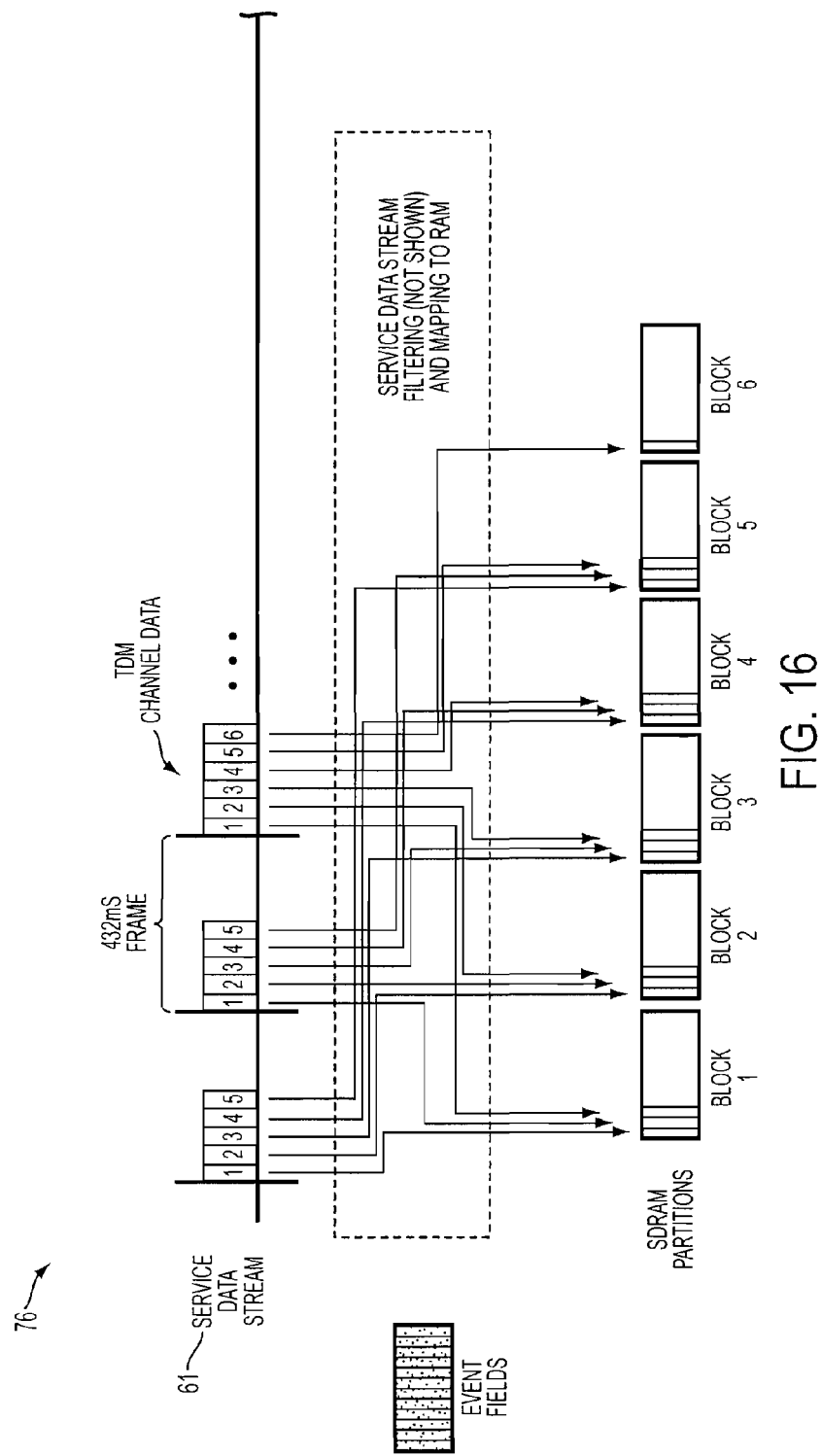
FIG. 16 illustrates buffering management in accordance with an exemplary embodiment of the present invention.

A RAM 76 for providing a multi-channel memory in accordance with an exemplary embodiment of the present invention is shown in FIG. 16 which could be implemented in any R/W memory technology such as a static RAM, SDRAM, DDRAM, embedded RAM or non-volatile memory block. The RAM device 76 is partitioned into 6 dedicated channel blocks indicated in FIG. 16 as Block 1 through Block 6. As frames of source data stream are received, each of 6 channels in a particular personalized radio channel configuration are extracted and mapped to a separate RAM memory block and recorded in circular buffer format, with the exception that buffering shall momentarily halt to prevent overwriting previous content in the active playlist or writing content which is listed on the do-not-play list. Pausing playback of a playlist song is allowed, as well as reverse or backtracking operations (e.g., limited to 3 songs).

Figure 17:
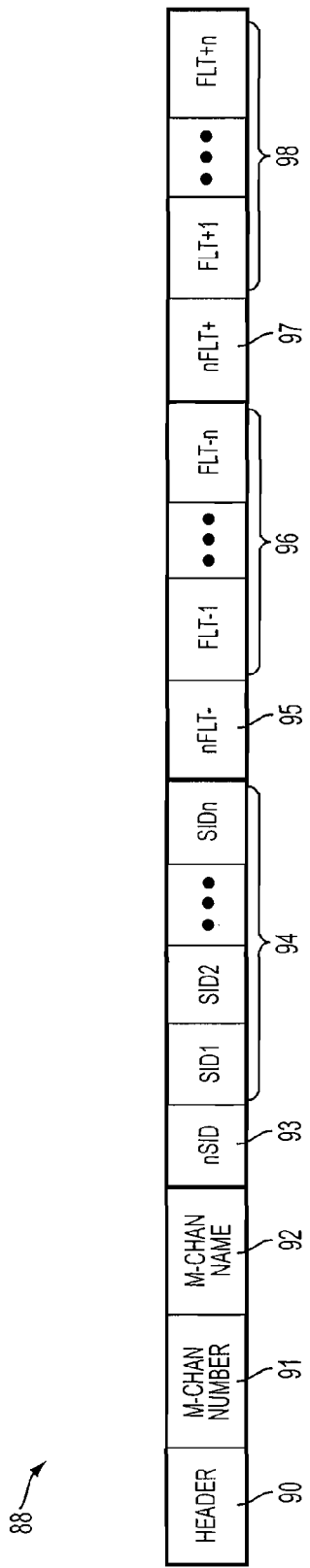
FIG. 17 illustrates a broadcast multi-channel configuration message in accordance with an exemplary embodiment of the present invention.

In accordance with another embodiment of the present invention, predetermined personalized channel configurations can be broadcast to receivers 14 and presented to users to simplify accessibility to the service. BIC messages 88 can have different formats and functions. The BIC can be used, in accordance with an exemplary embodiment of the present invention, to send different personalized channel configurations to receivers 14 (e.g., a different group of preselected channels that constitute a preset personalized channel configuration). An exemplary BIC message 88, that is, a broadcast multi-channel configuration message, is shown in FIG. 17. The broadcast multi-channel configuration message 88 enables the service provider to define tunable presets which contain channel configurations and filters necessary to enable a receiver 14 to automatically configure itself to build a playlist in accordance with the present invention. The receiver 14 receives the broadcast configuration message 88 and enables the subscriber to tune to the configuration by presenting a special multi-channel name and number or genre preset or equivalent in either the normal channel line-up or in a separate category or tuning window. Different multi-channel configurations may be broadcast based on genres, music/talk mixes, and so on. The message 88 can comprise the following fields:

Header 90: a message header identifying the message 88 as a multi-channel definition message;

M-Chan Number 91: the channel number to tune the radio receiver 14 to in order to receive this playlist configuration;

M-Chan Name 92: the name to display for this playlist configuration;

nSID 93: the number n of Service IDs (SID) or channels to simultaneously extract to build this playlist;

SIDx 94: each service listed separately which is to be extracted;

nFLT-95: the number of specific songs or artists to exclude from the playlist for this configuration FLT-x 96: each specific song or artist listed separately which will be excluded from the playlist (note: this field may be in the form of song/artist IDs or in text format);

nFLT+ 97: the number of specific songs or artists which will be used to search other channels (e.g., if one of these songs or artists are found on another channel, that song or artist will be extracted and added to the playlist); and FLT+x 98: each specific song or artist listed separately for the background channel search (note: this field may be in the form of song/artist IDs or in text format).

Figure 18:
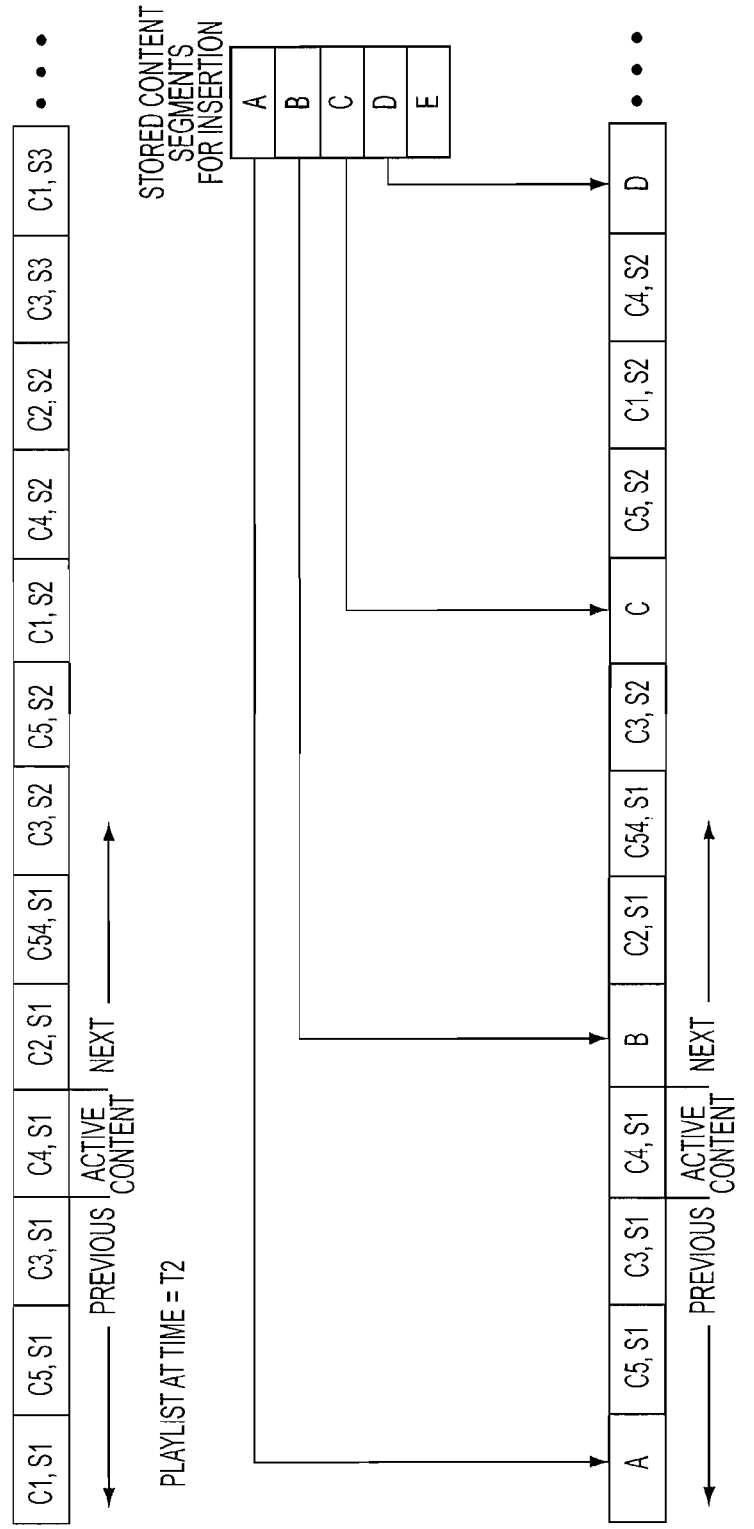
FIG. 18 illustrates personalized radio channel playlist management with content insertion in accordance with an exemplary embodiment of the present invention.

With reference to FIG. 18, in accordance with another embodiment of the present invention, the buffered playlist of a personalized radio channel can be subject to content insertion. For example, a radio receiver 14 can store content segments for insertion among the playlist segments such as commercials. The radio receiver 14 can be programmed to insert selected content insertion segments (e.g., segments A, B, C and D) at selected points among the queued playlist segments. The radio receiver 14 can be programmed to only play the full-length version of the inserted content segment as opposed to the truncated preview version. The radio receiver 14 can also be controlled to limit a user's ability to skip inserted content segments. Such control could be used to limit the ability to skip certain content segments, such as commercials, or to limit the number of skips allowed over a preset period of time.

Additional exemplary embodiments of the present invention will now be described with reference to FIG. 19. FIG. 19 is similar to FIG. 2 described above except for FIG. 19 also illustrating a data channel(s) indicated generally at 100. As will be described below, the data channel(s) 100 facilitate generation of personalized playlists at receivers 14 based, for example, on filter data corresponding to real-time user inputs indicating user preferences for music, or on broadcast control messages indicating broadcast stream music segments that are selected at the uplink for playback by receivers tuned to a predetermined personalized channel or Auto Track.

Figure 19:
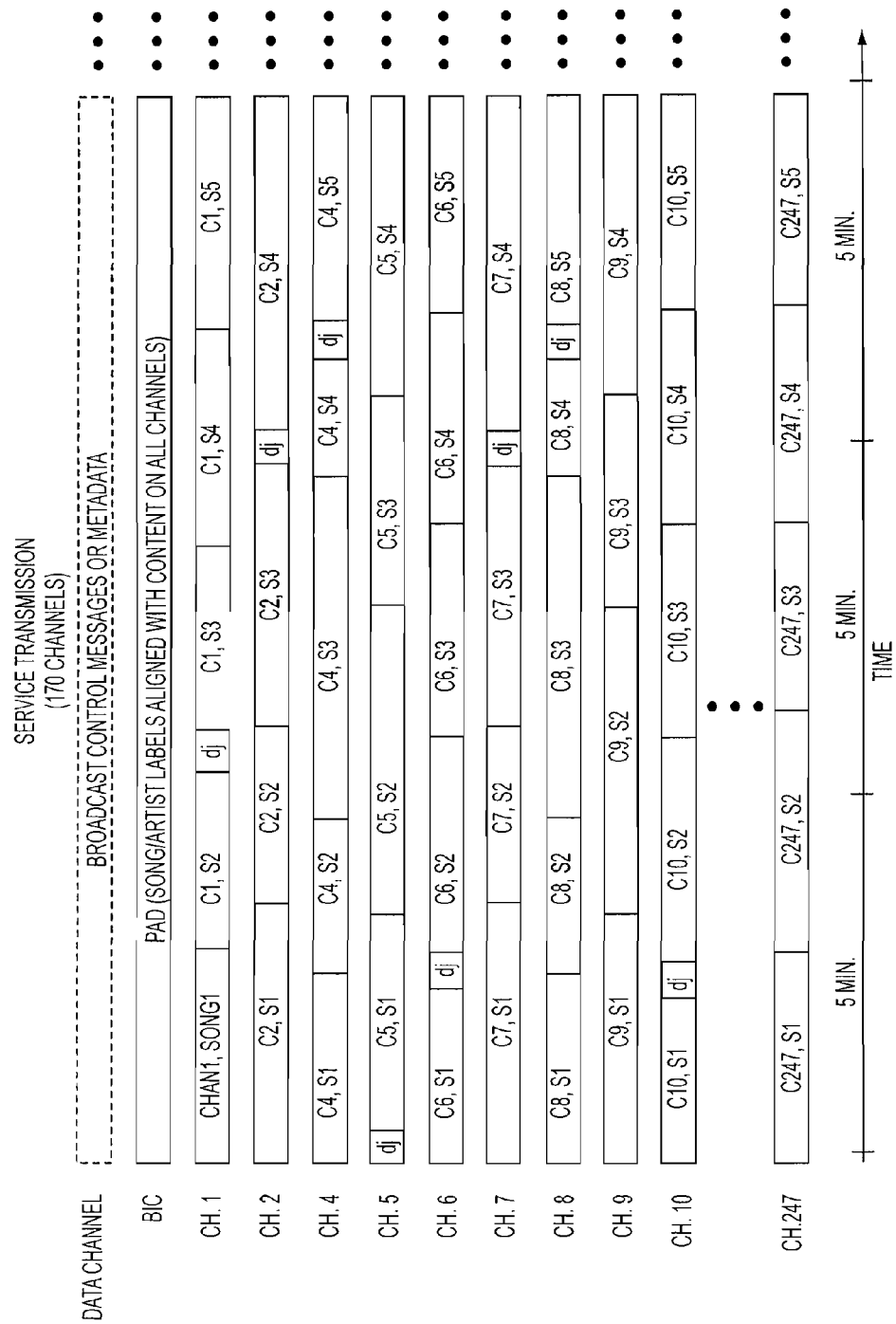
FIG. 19 depicts different program channels and a data channel in a source stream, the data channel comprising broadcast control messages or metadata to control selection of music segments from the program channels to build personalized radio channel playlists in accordance with exemplary embodiments of the present invention.

In accordance with an exemplary embodiment of the present invention, the data channel(s) 100 in FIG. 19 can comprise descriptive metadata for each song that is transmitted in a source stream(s) to facilitate extraction and storage of selected music segments (e.g., or songs) from the one or more received streams to generate a personalized radio channel playlist. The source stream can be, for example, an SDARS stream comprising multiple program channels with music segments. The descriptive metadata is preferably transmitted on a separate data channel 100 from the program channels and in advance of the corresponding songs' content transmitted in the source stream. It is to be understood, however, that the descriptive metadata can be provided within the program channels as opposed to a separate data channel, in a separate stream as opposed to being transmitted in the source stream, in advance of or concurrently with or after the corresponding song, or via a look-up operation (e.g., an index to the data or merely a song identifier is transmitted for facilitating look-up of the descriptive metadata by the receiver 14), among other methods, depending on the processing speed and memory utilization at the receiver 14.

The descriptive metadata for the active songs in the source stream is used with filter data created based on user preference inputs to identify, extract and store songs from the source stream(s) for generating the personalized radio channel playlist. For example, a subscriber can build a personalized music filter with simple input commands such as by pressing thumbs up or thumbs down keys (e.g., keys 32 and 34 shown in FIG. 6) during a song that is being played back from the received source stream(s) to enter filter data into a receiver memory such as any of the memories 76, 48, 80 or 78 shown in FIG. 15 (e.g., SD card 50 shown in FIG. 9). This entry of filter data may be achieved through the use of existing input buttons on a radio receiver 14 (i.e., programming existing control buttons used for scrolling and selecting menu options to operate as filter buttons in a filter mode of operation) or the use of dedicated input buttons such as keys 32 and 34 shown in FIG. 6.

The filter data preferably consists of the descriptive metadata for the tagged song, that is, the song being played back from the received stream that prompted the user to indicate approval or disapproval of the song using the programmed existing control buttons or dedicated buttons such as the keys 32 and 34. The metadata for all active songs in a broadcast stream (e.g., the 70 music channels among the 100 or so channels of audio content provided via an exemplary SDARS) is correlated with the filter data. If the correlation factor exceeds a predetermined threshold, the song is saved to a personalized channel buffer as described above in connection with FIG. 5, for example. Songs characterized by musical metadata that exceed a correlation threshold with the filter data can be simultaneously buffered from multiple concurrent channels (e.g., such as when a broadcast stream comprises multiplexed audio program channels) such as simultaneously saving up to 6 songs from 6 respective channels in a received multiplexed source stream.

In addition, correlating the descriptive metadata of active songs in a source stream with filter data is preferably performed as the music segments in the plurality of multiplexed audio program channels of the source stream(s) are being received. Further, generating the playlist preferably comprises contemporaneously multiplexing and storing the music segments, whose correlation factors exceed a selected threshold, as they are received.

A user or subscriber preferably tunes the receiver 14 to a personalized channel to hear the filtered buffered songs that constitute the playlist. The buffered songs are preferably cleared on each power cycle of the receiver 14. As stated above, the buffered playlist songs are preferably stored as of their respective start times in the source stream. Audio segments comprising "DJ chatter" are preferably not stored in the playlist buffer. The buffered songs that constitute the playlist are preferably added and dropped on a FIFO basis and can be navigated by the user, as described above.

The database of metadata is preferably stored so as to be accessible by an uplink facility or other transmission system(s) for the source stream(s) such as the programming center 20 in FIG. 1, as well as a database comprising a library of songs and other audio content available for transmission on the source stream(s). The uplink facility or other transmission system selects content from the library for transmission on the various program channels and multiplexes the audio content into the source stream(s) for transmission. The database of metadata is then accessed to obtain the corresponding descriptive metadata for the respective songs selected for transmission on the program channels. As stated above, a data channel 100 comprising the descriptive metadata for the selected songs can be sent with the source stream(s) and is preferably synchronized so that the descriptive metadata for each of the respective transmitted songs is sent in advance of its corresponding song by a selected amount of time.

The descriptive metadata can be implemented a number of different ways. The descriptive metadata is preferably musical metadata that comprises at least some song bibliographic attributes (e.g., artist, length) and at least some song composition attributes or features (e.g., genre, form, style, tempo, arrangement or composition, key, instrumentation, melody, harmony, rhythm, and so on). For example, a descriptive metadata database can be purchased from a commercial source such as AMG or All Media Guide or from another source, in which case the metadata database is immediately available for integration with audio content library. Such a metadata database is updated as needed as new material becomes available for transmission. Alternatively, a custom descriptive metadata database can be created by purchasing song characterization software and using it for each of the songs in the library, in which case characterization data for new material is immediately available that might not otherwise be if a commercially-available metadata database were used instead. The filter data created in response to user inputs at the receiver 14 can be all or a subset of the metadata attributes available for content in the metadata database.

Exemplary data channel 100 bandwidth requirements will now be discussed. The descriptive metadata contents for each song can be selected such that 25 features or attributes are used with 4 bytes needed per feature (i.e., 800 bits). Thus, a song metadata message that can be created and sent via the channel 100 can have a length of 850 bits allowing for overhead bits. In an exemplary SDARS system, messages are sent for the 70 music channels and songs are assumed to change approximately every 3.5 minutes. Accordingly, average bandwidth for descriptive metadata for 70 songs concurrently in the multiplexed program channels of the source stream is (850 bits×70)/(3.5×60 sec) or 284 bits per second (bps). To accommodate retransmissions and peak loads, a bandwidth for the descriptive metadata for all music channels is preferably at least 2 kbps.

In accordance with another exemplary embodiment of the present invention, the intelligence of determining what songs are to be included in the playlist is bounded to the uplink or transmission facility (e.g., programming center 20) and not the receiver 14. This embodiment simplifies receiver 14 implementation, and the uplink or transmission system can be upgraded over time to implement new algorithms for selecting songs for the playlist.

For example, the programming center 20 can select custom program channel playlists (herein after referred to as "Auto Tracks" or simply "Tracks") based on programming team's definitions. Based on these definitions, the uplink or transmission system 20 monitors songs on all channels that will be broadcast or otherwise transmitted on source stream(s) ahead of time (e.g., a few minutes before transmission) and determines which songs meet the definitions for a particular one or more Auto Tracks. The uplink or transmission system then composes and broadcasts or otherwise sends control messages to the receivers 14 that identify the songs for each Track. The broadcast control messages are preferably transmitted on the data channel 100 that is separate from the program channels as shown in FIG. 19, and in advance of the corresponding songs' content transmitted in the source stream. It is to be understood, however, that the broadcast control messages can be provided within the program channels as opposed to a separate data channel, in a separate stream as opposed to being transmitted in the source stream, or in advance of or concurrently with or after the corresponding song, among other methods, depending on the processing speed and memory utilization at the receiver 14. The identification of songs for a particular Auto Track can be provided as a separate message or combined in a single message with identification of songs selected for other Auto Tracks.

The receivers 14 receive and process these Track control messages. If a listener or user has selected a specific Track for playback, the receiver 14 buffers and plays the songs that belong to that Track as indicated by the control messages into a playlist buffer in a manner described above in connection with FIG. 5.

The Auto Tracks can be based on themes or celebrity musician names such as a mostly Rock theme with primarily songs sampled from the Rock genre, along with some songs from a current Hits list and a few songs from a Jazz genre. A celebrity's picks can also be used as a theme for selected songs for a selected playlist at the receivers 14. For example, an Auto Track can be defined at the programming center 20 to be "Dylan's Picks," that is, if Bob Dylan were listening to music such as an SDARS service, what song would he be listening to? Based on the songs that meet the defined theme or celebrity preference, other songs with similar characteristics or attributes can be located within the source stream using, for example, descriptive metadata.

Algorithms for song selection (hereinafter referred to as the "Uplink Song Picker") are preferably employed at the uplink or transmission system, as opposed to the receivers 14. The algorithms can be based on such industry technology as that provided by Pandora internet radio, the Music Genome Project, and other similar music analysis and selection services for locating music to meet users' preferences. As stated above, a database can be employed that contains the metadata for the song picker algorithm technology of choice. For Celebrity-based Tracks, the Uplink Song Picker is trained for each celebrity for whom an Auto Track is offered at the receivers 14. In other words, a celebrity can sit down for an hour or so on an uplink facility programming console and select favorite songs from the SDARS service library containing songs and other audio content available for transmission database. The song picker algorithm then selects other songs based on this initial input. In essence, this initial input can be the initial generation of a filter for that Auto Track that is similar to the filter described above, only it is generated for use at the uplink or transmitter and not the receiver 14. The metadata or characterization data of the filter can then be correlated with metadata provided (e.g., from a database) for each song in the source stream to determine if the definition or criterion for an Auto Track is met. In addition, the uplink song picker can be passive or proactive. In other words, the uplink song picker can be passive and simply monitor songs being transmitted on the program channels to determine if any songs met the Auto Track definitions or criteria. Alternatively, the uplink song picker can be extended to influence song selection on of the program channels in a proactive manner. For example, if no songs selected for transmission met any of the Auto Track criteria, then the uplink song picker can select one or more songs that do met the criteria for at least one Auto Track and request that it be inserted or programmed on a program channel for transmission.

Exemplary data channel bandwidth requirements for the broadcast control messages will now be described. The total number of Auto Tracks is preferably bounded to an upper limit such as 32. The Track song titles change over time, along with the songs selected and transmitted in the programmed channels of the source stream(s). A selected amount of information is used to identify each song that is determined to meet the definition for a particular Auto Track. For example, 10 bytes of information can be used per song designated for an Auto Track, including Auto Track ID, Program ID, SID, Time Window, and so on. In an exemplary SDARS system, there are 70 music channels and songs are assumed to change approximately every 3.5 minutes. Accordingly, average bandwidth for a broadcast control message can be (80 bits×70)/(3.5×60 sec) or 27 bps, assuming that 70 songs concurrently in the multiplexed program channels of the source stream meet the definition of at least one Auto Track. To accommodate retransmissions and peak loads, at least 200 bps of bandwidth is allocated for broadcast control messages. If the Song Picker determines that more than one concurrent song (e.g., current songs on different program channels) in the source stream have descriptive metadata that meet the definition of the same Auto Track, either all of an upper limit of the songs are included in the broadcast control message for buffering in the playlist for that Auto Track or only the song with the greater correlation factor is used.

Illustrative Embodiments of Celebrity or Virtual DJ Channels

Figure 20:
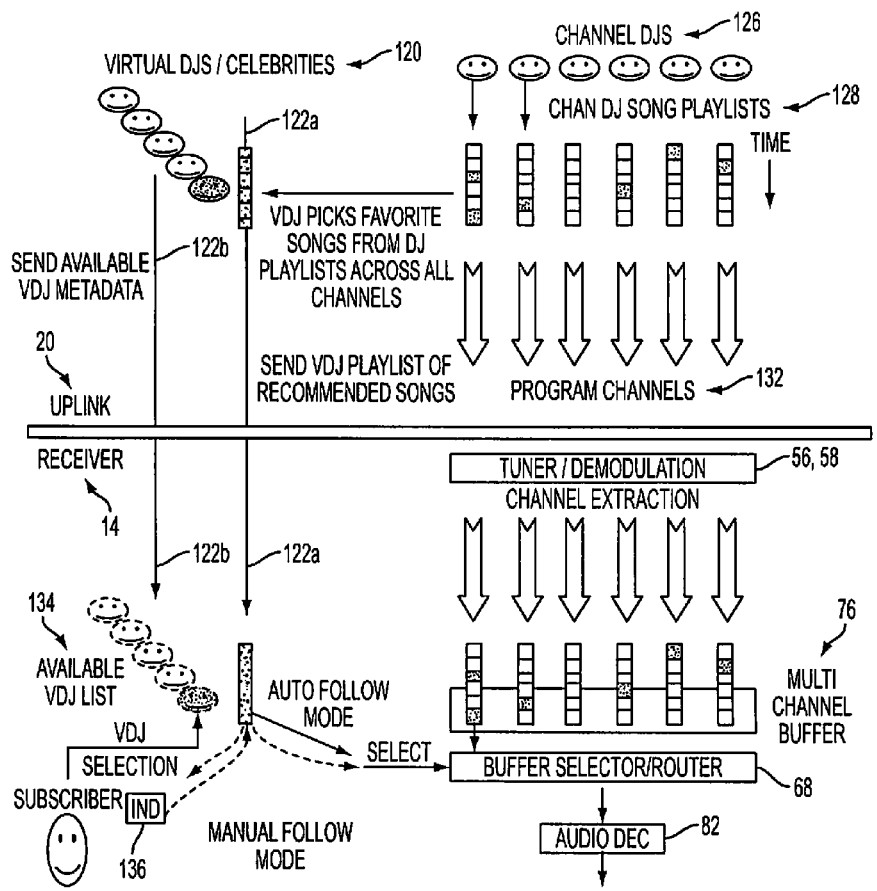
FIG. 20 depicts a virtual DJ recommendation service in accordance with an exemplary embodiment of the present invention.

As stated above and with reference to FIG. 20, at the uplink 20, content 128 such as songs played on a music channel, for example, are typically picked by one or more programmers or curators (e.g., a disk jockey or "DJ") either immediately before their actual broadcast/transmission time, or prior to actual broadcast/transmission time via a previously generated playlist. The curator is indicated in FIG. 20 as a "Channel DJ" 126. Also, as stated above, a celebrity or other person (hereinafter referred to as a Virtual DJ or VDJ) 120 can browse content such as songs on his/her favorite channels, or all program channels, before they are broadcast, streamed or otherwise transmitted. The VDJ 120 then selects his/her favorite song 130 currently playing on one or more transmitted program channels 132. Metadata 122 (e.g., metadata 122a identifying this song and metadata 122b identifying this VDJ) is then transmitted over the broadcast service to all users (e.g., via the PAD or a data service) since, as stated above, metadata 122 is provided for each song of an Auto Track in the source stream.

For example, multiple VDJs 120 can be defined at the uplink 20. Each VDJ would typically have a unique personality and musical taste representing the tastes of some population of users (e.g., VDJ-x may select popular songs from the 60's, 70's and 80's, and VDJ-y select a mix of Jazz and Blues and occasionally classical Reggae, from the program channels that are curated for transmission to users). VDJs 120 can also represent themes such as music that fits various moods (e.g. mellow or upbeat) or music that fits various occasions (e.g. at work, driving, or going out with friends). Occasionally, a "visiting" VDJ 120 may be made available. This VDJ may be a particular popular personality or music performer. Metadata 122 describing all available VDJs 120 and their profile information can be transmitted over the broadcast to the radios 14 for presentation to the user (e.g., sent via control messages to radios 14 at other times besides immediately before celebrity-selected content is transmitted) in order to provide users 14 with information on different Auto Tracks or celebrities 120 that users can choose from in order to listen to the corresponding Auto Track. The metadata 122 can also indicate how strongly the VDJ likes the song (e.g., a score value). Alternate song recommendations with lower score value may also be transmitted in the metadata 122. As stated above, the VDJ can be an actual person or can be based on an automated song picking algorithm (e.g., the "Uplink Song Picker" described above).

At the radio 14, a user may sometimes browse his/her favorite channels when searching for songs he/she likes. In accordance with an illustrative embodiment of the present invention, a user may select a particular VDJ 120 from a list 134 of available VDJs generated at the radio 14 (e.g., on a user interface (UI) screen 23) via a radio 14 user input (e.g., a button 42-45 or dial 28 or button generated on the graphical user interface 23). Such a selection would typically be based on some affinity the user finds with the VDJ. Once selected, the user can listen to the song selections of the VDJ either automatically or manually.

For example, based on the transmitted VDJ song selection metadata 122a, the radio 14 can automatically tune to the VDJ selected songs 130 across the multiple channels 132 of the broadcast service (e.g., SDARS). As explained above, the radio tuner/demodulator 56, 58 can extract the channel(s) from the received stream and the selected songs 130 (e.g., by comparing the received metadata 122a with the metadata provided in the demodulated source stream for the various transmitted content segments that are eligible for VDJ selection, which can be all or some of the content on some or all of the program channels). The extracted selected songs 130 are stored, for example, in the multi-channel buffer 76 (e.g., extracted and mapped to a separate RAM memory block and recorded in circular buffer format, as stated above). In accordance with one illustrative embodiment, the metadata 112a is transmitted to the radio 14 in advance a sufficient amount of time to buffer the program channel with the next recommended song 130 in the source stream, and then to dynamically reallocate buffer resources to a different program channel with the next recommended song (e.g., in terms of start times within the transmitted stream). Alternatively, multiple program channels can be buffered simultaneously (e.g., different channels 132 containing VDJ selected songs 130) as described below in connection with the Mix Channel function. The system controller 68 (e.g., indicated as a buffer selector/router in FIG. 20) can be configured to automatically play respective ones of the buffered songs 130 (e.g., in the order of their respective start times in the transmitted stream) via the audio decoder 82. Example buffer management is also described below in connection with illustrative embodiments of personalization of mix channels.

Alternatively, instead of the radio 14 automatically tuning to the different songs on the different channels, an indication 136 (e.g., via a display the radio 14 UI screen 23 or an audible prompt via the radio or vehicle head unit speaker 84) can be presented to the user informing the user that a VDJ recommended song 130 is available on a channel other than the channel to which the radio is currently tuned. The indication 136 can be, for example, by way of highlighting a "VDJ recommends" icon on the radio display 23, or by highlighting a channel icon of a preset channel list (e.g., when a VDJ recommended channel group is presented as the radio's current preset channels), among other indications. Upon receiving the indication 136 of an available VDJ recommendation, the user can then make a selection via the UI 22 (e.g. a button press or verbal command) to have the radio 14 tune to the channel of the currently recommended song.

This semi-automated manner of following a VDJ's recommended songs or other type of selected, transmitted content can be advantageous for offering different subscription services and rates. For example, a radio service can allow for a user to upgrade from a semi-automated VDJ following feature (e.g., available with a standard subscription fee and possibly even based on maintaining compliance with a statutory license) to fully automated VDJ following feature (e.g., available with higher subscription fee based on different licensing terms). In some cases, a manual VDJ following feature may be preferred by the user over an automatic VDJ following feature. For example, a user may wish to listen to a particular channel (e.g., could be a music channel or other type of program channel such as a comedy or news channel) and prefer to have the choice of occasionally changing channels to hear VDJ recommended songs 130. A user may wish to follow a VDJ recommendation 130 only if the VDJ has assigned a high score to the recommended song (e.g., the metadata received for VDJ-supported content segments such as songs in the program channel playlists 128 can be used by the system controller 68 to indicate a VDJ rating or highly recommended icon on the screen 23). Furthermore, some VDJs 120 may have periods of time where no songs are recommended (or highly recommended). With the manual VDJ following mode, a recommendation available indication 136 can be presented only when a recommended song is available for the selected VDJ 130. Further, under the manual VDJ following model, the user can also follow multiple VDJs recommendations, whereby indications of recommendations (and score or rating of recommendations) for multiple VDJs are presented to the user via the UI screen 23.

In accordance with another aspect of illustrative embodiments of the present invention, the radio 14 can automatically determine a user's affinity to particular VDJs. As explained above, the ability to rate songs via a like/dislike selection is provided on the UI 22 (e.g., see FIG. 6 buttons 32,34) to generate filter. Thus, after the user, over time, rates currently playing songs, corresponding metadata or characterization data is used to generate a filter that can be correlated with metadata provided in the source stream. The radio 14 therefore has filter data with which to compare the user-rated songs to the rated songs of all the available VDJs. VDJs that like the same songs as the user can then be indicated to the user. For example, the user may be prompted if he/she would like to follow one or more VDJs when a high degree of correlation or affinity to the VDJs is detected by the system controller 68 based on the user's filter data. The radio 14 can also simply monitor the channels that the user most frequently plays to determine affinity to the VDJs (e.g., compare a user's most frequently selected channels to VDJs' favorite channels).

Songs played on the different program channels (e.g., in SDARS or other multiple channel programming source) are not synchronized to all start at the same time. In fact, the respective start/stop times of content segments such as songs across various channels are generally random. This can present a quality of service problem to a VDJ following feature since the user may miss parts of the songs as he/she follows VDJ recommended songs 130 across the different channels 132. To avoid having only a fragment of a VDJ song 130 played back, a favorite channels list can be broadcasted for each VDJ (e.g., a list is included in the VDJ broadcast metadata 122a). Each VDJ will only recommended songs played on the VDJ's favorite channels. When a VDJ is selected by the user for following, the radio 14 automatically begins buffering each of the VDJ favorite channels. Each channel buffer has some finite depth (e.g. 30 minutes) and can be a volatile-type buffer (i.e., song content is not preserved across power cycles). When following a selected VDJ's recommendations, the radio 14 will automatically play VDJ recommended songs from the beginning of each song when the beginning of the song is available in one of the channel buffers 76.

A radio 14 can be configured to store a history of VDJs that the user has commonly selected for following. When the radio's channel extraction resources and buffer resources allow, favorite channels from one or more of the most commonly selected VDJs can be buffered automatically by the radio, prior to the user's VDJ selection. In this way, the beginning of songs are available immediately when the user eventually selects of one of these VDJs to improve the listening experience when channel changing, as described in International PCT application no. PCT/US2012/25091 in connection with Tune Start™.

In addition, as an enhancement to the VDJ following service, a user can be allowed to skip over VDJ recommended songs when the same VDJ recommended songs are available in more than one of the channel buffers for possible playback within a designated period of time. In this case, the radio can be configured to monitor for and disallow certain song selection (e.g., selection of the same song for playback more than a designated number of times within a designated period of time).

Illustrative Embodiments of Personalization of Mix Channels

In accordance with illustrative embodiments of the present invention, selected multiple channels can be buffered and automatically and alternately switched to in a designated channel order to play back a track or segment before automatically switching to another one of the selected channels, thereby generating a mix channel using minimal or no user involvement. In other words, a mix channel is created to play selected segments from the selected multiple channels in a designated order automatically without reference to any user preferences or personalization (e.g., no user input of favorite artists and/or songs) such that the user has no control over which buffered segments or tracks are played from which of the received selected multiple channels other than navigation commands such as Pause, Reverse, and Forward. Such mix channel generation shall hereinafter be referred to as "Mix Channel" operation, and the selected multiple channels whose content is blended in the Mix Channel shall hereinafter be referred to as "constituent channels" of that corresponding Mix Channel.

For example, a radio receiver 14 can be programmed to play an entire segment or track from each of the selected multiple channels on a round-robin or other predetermined basis regardless of user preferences for particular content that may be on those channels. Such an illustrative implementation simplifies the user interface. For example, buttons 32 and 34 on the user interface 22 depicted in FIG. 6 can be eliminated, as well as preview functions and displays such as screen 23 in FIG. 8. In other words, a user is exposed to spontaneous, diverse, curated content mixed from different selected buffered channels and without needing to know what is currently in buffer(s) (e.g., in the RAM 76) unlike in a preview mode. User can simply skip playback of a segment selected that has been automatically selected for playback by Mix Channel operation, and another segment from that buffered channel, or from other one of the selected buffered channels used to generate the Mix Channel, is played back. The segments are played in full unless the user elects to navigate away from that track or segment (e.g., using fast forward or reverse buttons provided on most radio receiver devices).

The radio user interface 22 depicted in FIG. 6 is intended for illustrative purposes only. It is to be understood that the radio receiver 14 can show more or less information about the current channel and currently playing track; that there can be more or fewer Preset buttons; that instead of using Preset buttons to select an alternate channel, the radio receiver 14 can support a mode of listing Favorite channels previously selected by the user from which a new channel can be selected; and that the specific complement and arrangement of buttons and display elements can vary greatly from radio receiver to radio receiver. For example, the buttons can be graphical user interface buttons that represent favorite channels (e.g., that are programmed automatically and dynamically to reflect the user's taste over time based on radio receiver operations to select channels/tracks for listening), that are changeable over time, and that are surfed via any one or combination of toggle buttons, dials, up/down buttons provided on the radio receiver 14.

In addition, the radio receiver or user device 14 can be programmed to generate User Interface displays 23 to allow one or more of the following features with respect to a Mix Channel: deleting a constituent channel from a Mix Channel, replacing one of the constituent channels in a Mix Channel with a different channel, replacing a Mix Channel Preset button assignment with a conventional one-channel Preset button assignment, and replacing a conventional one-channel Preset button assignment with a Mix Channel Preset button assignment.

In accordance with an illustrative embodiment of the present invention, the radio receiver 14 can be configured to have a menu-driven user interface 23 to define a Mix Channel generated using at least two distinct sources of audio content such as stored music, SDARS channels, FM channels, AM channels, and so on. The user is prompted to select the sources of content and then assign the mix to a specified Preset button of the user's choice. Alternatively, broadcaster or content provider can define a Mix Channel (i.e., instead of or in addition to user-defined Mix Channels) by transmitting a "suggested mix" definition over the air or other transmission means. The radio receiver 14, in turn, can present a predefined Mix Channel to the user as a virtual channel within the channel line-up of other (non-mix) channels, for example. The broadcaster-defined Mix Channels can be grouped into a separate category of channels (e.g., Mix Channels) for display and channel navigation and selection. Alternatively, the broadcaster-defined Mix Channels can be displayed among existing channels (e.g. a "Rock mix channel" would appear with the other rock channels in a genre or category-specific listing, and a Pop Mix Channel would appear in the Pop category). Such display models are provided to radio receivers via in-band or out-of-band messaging from the broadcaster. Further, broadcaster-defined Mix Channels can appear in displays of channels for corresponding different genres or categories, while user-defined Mix Channels can be displayed in a separate mix category. Alternatively, broadcaster-defined Mix Channels and user-defined Mix Channels can be displayed in the same mix category.

Different methods can be used to notify users of broadcaster or content provider-recommended sets of channels for Mix Channel operation. For example, as described below, a broadcaster-defined Mix Channel can be an extension of Featured Favorites, that is, a bank of channels can be defined and updates sent. Default blends can be created. Updates can be transmitted to radio receivers via a message. Thus, a user can pick one or more recommended Mix Channels based on Mix Channel descriptions provided in some type of extended channel description service. Alternatively, a BIC message can be sent which has fields to define Mix Channels (e.g., Mix Channel name and label block to assist radio receivers in displaying the Mix Channel), as well as fields to identify the constituent channels. A BIC message or other type of transmitted message to define Mix Channels is valuable to users having difficulty understanding the user interface on their radio receivers. With a BIC message or other messaging or data service (e.g., similar to Channel Description Service), broadcaster-defined Mix Channels are displayed on a channel list like other channels with numbers and names assigned to them (i.e., for radio receivers that are configured to know how to parse this type of message).

In accordance with illustrative embodiments of the present invention, a radio receiver 14 can comprise a memory or at least part of a memory to implement a multi-channel buffer (hereinafter generally referred to as "content buffer" 76) that is managed to buffer the selected received (and, in some content transmission systems, demultiplexed) constituent channels associated with a Mix Channel configuration corresponding to a currently selected Preset button, and/or the VDJ Favorites channels from which to store VDJ recommended songs, and/or Smart Favorite™ channels. For example, the radio receiver 14 can be provided with a memory or a part of a memory that is managed by firmware to support storing content from multiple channels that have been broadcast, streamed or otherwise transmitted for buffering at least the selected received (and, as needed, demultiplexed) Mix Channel constituents, and optionally other channels such as the Smart Favorite™ channels of the currently active Tune Start™ channel configuration, and/or VDJ Favorites channels as described above. A Smart Favorite™ channel is a channel designated for maintenance by a user device in a Background Instant Replay (IR) Buffer. Reference is made to commonly owned U.S. Pat. No. 7,809,326 and U.S. Patent Application Publication No. 2009/0320075, the entire contents of which are hereby incorporated herein by reference, for storage of received broadcast or streamed content at a user device 14.

The radio receiver 14 can be configured to only have a LIVE mode whereby content is stored, for example, only to volatile memory for play back substantially as it is being received. Exemplary embodiments of the different implementations of memory in the instant invention can include two modes: LIVE mode and MY RADIO mode. In the LIVE mode, the user is listening to one of the plurality of channels of the broadcast content stream in real-time or essentially as it is being received. The receiver 14 buffers at least the content from the channel to which the receiver is currently tuned. As described herein, the radio receiver 14 also buffers content from selected plural channels (i.e., Mix Channel constituents) to implement a Mix Channel operation in accordance with an embodiment of the present invention, and/or VDJ Favorites channels, or Smart Favorite™ channels, or all channels depending on the constraints of the buffer 76. In MY RADIO mode, a user is listening to content from the broadcast stream that was previously received and stored in nonvolatile memory, and the user's radio receiver is no longer in the LIVE mode. For example, a user may select MY RADIO mode when the radio receiver is incapable of receiving the broadcast stream (e.g., due to signal loss) or wishes to hear content that the user has selected for playback and is not available when the user's radio receiver is in LIVE mode.

An illustrative method for implementing the Mix Channel operation involves buffering the content received from multiple channels that have been pre-selected by or for the user, so that tracks from at least each buffered channel constituent of the Mix Channel are available for selective time-shifted playback while in LIVE mode. The radio receiver 14 maintains a buffer (e.g., content buffer 76 described in connection with FIG. 19 above), implemented with RAM (e.g., RAM 76 in FIG. 5), HDD, flash or other storage media, in which content from the buffered channels is continuously cached using a modified FIFO (first in first out) method, for example, during reception. While the buffered content can be maintained in volatile memory and therefore erased upon powering down the radio receiver or user device 14, the multiple-channel buffer 76 can be saved in persistent memory so that content is available instantly as soon as the radio receiver is powered up.

The content buffer 76 is sized sufficiently such that at least one full track (subject to some maximum track duration) from each buffered channel is maintained in the content buffer. The number of buffered channels can be any number depending on the memory and processing constraints of the user device and the amount of memory allocated per channel. As stated above, the radio receiver 14 is capable of playing content either live (i.e., as the content is received), or from content previously cached in the content buffer (e.g., for time-shifted playback such as at the beginning of a cached but un-played track or in response to a navigation input such as a skip operation) during live reception (i.e., Mix Channel, VDJ following Feature and Tune Start™ operations but not playback in MYRADIO mode).

When the user skips a track while listening to a Mix Channel during the LIVE mode, playback begins from the start of a track previously cached in the content buffer 76 for the corresponding Mix Channel constituent. Thus, the user hears content from the constituent channel from the start of a track. As the user continues to listen to the Mix Channel, he effectively is listening to channel content that is time-shifted. In other words, the Mix Channel constituent content is delayed from the real-time content reception by, for example, a duration equal to the time the channel content was selected for playback in the Mix Channel minus the time the cached track started broadcasting or transmitting.

In accordance with an illustrative embodiment of the present invention, the content buffer 76 comprises a Background Instant Replay (BIR) buffer and Foreground Instant Replay (FIR) buffer. The BIR is used to buffer content of some or all of received program channels (e.g., at least content from the constituent channels of a Mix Channel configuration and optionally Smart Favorite™ channel content as disclosed in the afore-mentioned International PCT application no. PCT/US2012/25091, or VDJ following feature). The FIR is used to buffer the currently selected channel for listening in the LIVE mode. More specifically, in accordance with the Instant Replay (IR) operation, a radio receiver or other user device buffers the audio content of the currently tuned channel in the FIR buffer (e.g., a FIFO RAM buffer) so that the audio of the channel can be paused/resumed, skipped by track forward and backward, and rewound and fast-forwarded. IR navigation capabilities can be restricted on a channel basis, through configuration data provided in a broadcast data service. For example, for music channels, the number of rewind and forward skips can optionally be limited to 1 and 5, respectively, for each channel per hour. In one illustrative embodiment, the FIR buffer is the main IR buffer used for the channel currently tuned by the user and is to be distinguished from the BIR buffers used to accumulate content for un-tuned Mix Channel constituents or Smart Favorite™ channels.

As an example, constituent channels for Mix Channel operation each have their content constantly buffered in a FIFO RAM buffer in the content buffer that is employed as the Background Instant Replay (BIR) Buffer (e.g., with a capacity of around 10 to 60 minutes for each constituent channel depending on product RAM resources and cost targets). Once a constituent channel is selected for play, the BIR Buffer content can be copied into the radio's Foreground Instant Replay (FIR) Buffer, replacing its contents and effectively seeding it with historical content for further radio and user manipulation. It is to be understood that copying need not be implemented as an actual memory copy but can instead involve pointer management and other methods.

In view of the foregoing, it is to be understood that channels (e.g., Mix Channel constituents, and/or Smart Favorite™ channels and/or VDJ Favorite channels) are buffered in the background even if the user is not actively listening to, for example, the Mix Channel or VDJ Favorite channel. When a track or segment ends or the user has employed a Forward or Reverse skip operation, the next song in the multi-channel buffer is played. The song can be, but most likely is not, played back from the same channel. The radio receiver 14 generally automatically switches to the next constituent channel according to the Mix Channel configuration order for constituent channels. The number of buffered songs can grow rapidly over time. For example, for each 3 songs played on 4 constituent channels in a Mix Channel, there can be approximately 10 more songs added in the content buffer that the listener can skip to if desired. After an hour, the number of new content tracks or segments (e.g., songs) queued ahead for the 4-channel Mix Channel can grow to over 60 songs, assuming typical music channel bitrates and buffer sizes in existing radio receivers. Thus, a user is provided with dozens of songs from which segments are automatically selected from each of the 4 constituent channels for play back and to skip through if desired, thereby exposing the user to more diverse content than tuning the receiver to only a single channel during a listening period. The radio receiver does not require a large local database built over time (e.g., a large local database for storage per channel). The content buffer is instead refreshed with what is broadcast. No user interaction is required to simply enjoy the mix or blend of content from the constituent channels, that is, no new radio controls, buttons or menus are required. The user can simply skip uninteresting content in the Mix Channel playlist. Playback, however, is not user-driven based on knowledge of what is forthcoming for playback (e.g., preview) or content preferences specified by the user.

As stated above, the number of channels that can be simultaneously designated as buffered channels (i.e., supported with their own BIR Buffer) to support one or more Mix Channels, Smart Favorite™ channels, or VDJ Favorite channels can vary depending on radio receiver or device 14 resources (e.g., storage capabilities) and device data/audio extraction capabilities. In a radio receiver or user device 14 with sufficient capacity for buffering and processing, all channels can be processed as a buffered Smart Favorite™ channel, or for Mix Channel operation regardless of whether the channel is part of an actively configured Mix Channel or not. In some cases, the radio receiver may not have capacity to buffer all program channels being received. Thus, when a user selects a new Preset button in a particular Preset bank that is associated with a particular Mix Channel, the constituent channels of that Mix Channel will begin fill their respective BIR Buffers.

In accordance with illustrative embodiments of the present invention, each channel buffer in the multi-channel content buffer 76 is managed as a normal circular buffer in which the oldest content is dropped and replaced with the newest content. The receiver or user device 14 determines which content segments in the buffer to skip, which results in them being dropped from the content stream. The skipped segments remain in the buffer and are managed no differently than other segments.

Different methods for managing the buffered channel contents can be used, depending on the storage resources of the radio receiver or user device 14 and the different combinations of features achieved by illustrative embodiments of the present invention. For example, in one implementation, the radio receiver 14 maintains at least one full track in the content buffer 76 for each buffered channel. Each time a new track is cached for a given channel, the previous older track for that channel is deleted from the buffer to make room for additional caching.

In accordance with an alternative illustrative embodiment, the radio receiver 14 maintains more than one full track in the content buffer 76 for each buffered channel. The number of tracks cached for each channel may be fixed in number (i.e., n tracks per channel) or based on time duration (i.e., all full tracks cached within the previous m minutes). In still yet another illustrative embodiment, the radio receiver 14 maintains all content, whether complete or incomplete tracks, for a set duration per track (i.e., all content received for the channel for the previous m minutes) or a set amount of storage per track (i.e. all content received for the channel that can be stored in k bytes of content buffer memory.)

Content buffer 76 storage may be allocated to buffered channels based on a fix amount per channel (e.g., by duration or by storage), or may be dynamically allocated to buffered channels to accommodate differing track lengths currently cached (i.e., each channel allocated storage so that it can cache n channels for that channel).

The radio receiver 14 can limit the length of a cached track to a set maximum duration or size (e.g., 10 minutes or 4 MBytes) to accommodate unusually long tracks. Depending on intended behavior, such long tracks may be continuously cached in a FIFO manner so as much of the track as possible is maintained in the cache, or may be deleted (so the user is unable to play from a cached track unless it is certain it can be played from the start).

Multiple methods for storing and retrieving cached data into and out of the content buffer 76 can be used, including but not limited to continuous ring buffers, fix block allocations and linked lists, and other methods apparent to those skilled in the art.

Whenever a given conventional user Preset bank is active (i.e., the Preset buttons are each assigned to a single channel and not a Mix Channel) or a VDJ has been selected such that the VDJ's Favorite channels are buffered, the channels in that Preset bank or group of VDJ Favorite channels are buffered and, by default, supported by the Tune Start™ operation and can be, for example, blended together using a Mix Channel operation, or automatically or manually tuned to for following VDJ selected content. When changing to a different conventional user Preset bank, the replacement of the currently designated Smart Favorite™ channels from a previously active Favorites bank with the set of channels from a new active Favorites bank can be delayed until the new active Favorites bank has been the active bank for 5 seconds, for example.

Once the next constituent channel is determined for playback (e.g., based on channel order configuration of the Mix Channel, or on a designated order of buffered VDJ recommended songs 130), the radio receiver is configured to determine the candidate track or playback point within that constituent channel. In an accordance with an illustrative embodiment of the present invention, a radio receiver or user device 14 is programmed to employ Playback pointer(s) in the channel buffer(s) of content buffer 76 to designate the point in the buffer from which buffered content is played back to a user, which may or may not be substantially the same as the real-time broadcast and received point (i.e., "live" playback point). For example, in the cases of Mix Channel, VDJ Follow and Tune Start™ operations, the playback point in a buffered channel is likely to be the beginning of the oldest, un-played cached track or segment, as opposed to the "live" playback point. Pointers can also be employed to indicate the Last Play Point to facilitate the radio receiver determination of what buffered content has been played or un-played. The Playback pointers, Last Play Point pointers and any other pointers can be implemented as write pointers to real-time content in the content buffer 76 (e.g., where the multi-channel buffer can be implemented as respective circular buffers for respective buffered channels). The radio receiver or user device 14 can be operated to pick any playback point in simultaneous write buffers that has not been overwritten, and then to output the buffered content beginning from that point to the user. Further, the radio receiver or user device 14 can be operated to automatically change to a playback point in another buffer that has not been overwritten in accordance with the programmed operation (e.g., Mix Channel operation, or Tune Scan™ or Channel Scan operations as described in the aforementioned International PCT application no. PCT/US2012/25091). Thus, the channel buffer 76 can be configured using multiple channel buffers and pointers as opposed to storage of a multiplexed playback channel buffer wherein selected content from selected channels are queued for the purposes of playback.

Different methods can be used for selecting which candidate track to play during Mix Channel operation following a channel change corresponding to the designated channel order in which tracks from constituent channels are played back (e.g., from oldest cached track, from newest cached track, and so on). For example, in accordance with one illustrative embodiment, the Mix Channel operation can start playing the oldest un-played cached track among respective ones of the constituent channels according to their playback order, and then play the next oldest un-played cached track among all constituent channels, and so forth. In accordance with another illustrative embodiment, other cached tracks or segments from the constituent channels can be played. For purposes of determining the oldest track that has not been previously played by the user, any track with a Last Play Point within the track and all older tracks are treated as previously played by the user.

In accordance with illustrative embodiments of the present invention, for each constituent channel of a Mix Channel, the track or segment played from that constituent channel is played from the start of the track, from its buffered content, instead of from the live or real-time broadcast position. Thus, the user is able to hear tracks from their start during Mix Channel playback, making the listener experience more satisfying.

As exemplified above, different policies are implemented by the radio receiver 14 when playing back content from different constituent channels (i.e., an automated channel change during Mix Channel or VDJ following feature). It is to be understood that a policy implemented by the radio receiver 14 as described herein can be a set of rules or algorithm(s) implemented in software, or indicated in metadata provided to the radio receiver, for example, for controlling radio receiver functions such as caching or buffering, selecting which track from which to play following channel change, or channel re-selection, the play position (e.g., from the start or other position in the track) from which to playback the cached track, and so on.

For example, the set of rules or algorithm used by the receiver 14 to control the sequencing or playback of tracks can be configured to accommodate or comply with legal restrictions (e.g., contractual or licensing restrictions) or regulatory restrictions on playing too many tracks by the same artist within a certain time period over streaming or broadcast media unless one of the constituent channels of the Mix Channel or VDJ following feature exceeds these limits permissibly. In other words, the radio receiver can be programmed to permit a Mix Channel or VDJ Favorite channel that includes an artist-specific constituent channel (e.g., a single constituent channel dedicated exclusively or primarily to a single artist such as an Elvis Channel or a Grateful Dead Channel, or E-Street Radio) to exceed limits on repetition for that artist set by regulatory, contractual licensing restrictions.

Figure 21:
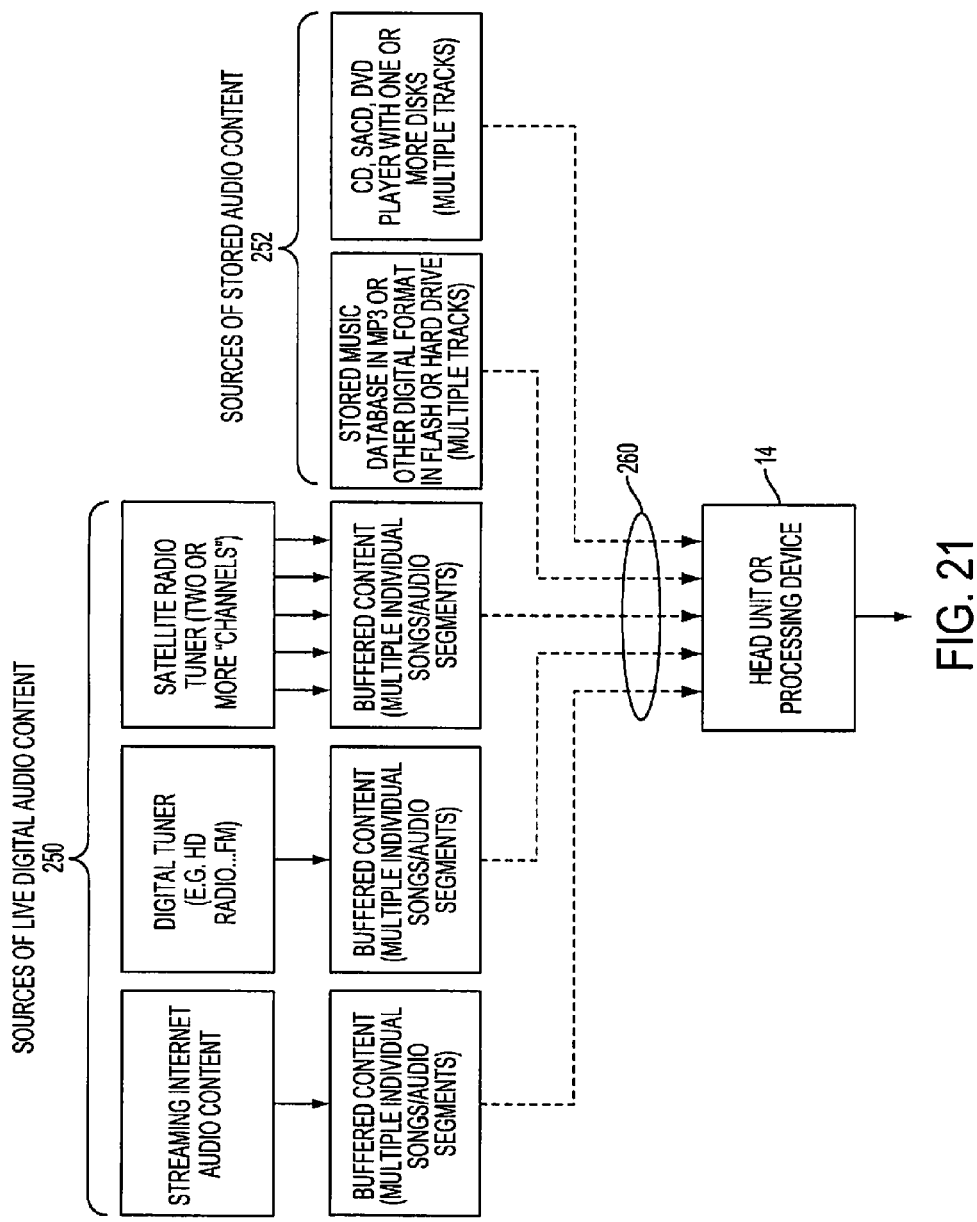
FIG. 21 illustrates creating a Mix Channel or Playlist from diverse content sources in accordance with an exemplary embodiment of the present invention.

Constituent channels for Mix Channel operation have been described herein as multiplexed program channels in a transmitted content stream such as SDARS. This specific example of broadcast content is intended for illustrative purposes only. With reference to FIGS. 9 and 21, it is understood that there could be many more channels (e.g., hundreds of channels); that the channels can be broadcast, multicast, or unicast to the receiver; that the channels can be transmitted over satellite, a terrestrial wireless system (FM, HD Radio, etc.), over a cable TV carrier, streamed over an internet, cellular or dedicated IP connection (e.g., 2-way IP) or otherwise transmitted wirelessly or via wireline communications; and that the content of the channels could include any assortment of music, news, talk radio, traffic/weather reports, comedy shows, live sports events, commercial announcements and advertisements, etc. "Broadcast channel" herein is understood to refer to any of the methods described above or similar methods used to convey content for a channel to a receiving product.

In accordance with illustrative embodiments of the present invention, personalization of mix channels can be provided in both IP-streaming and broadcast transmission contexts to improve users' experiences with transmitted curated content such as exposing the user to new and diverse content. For example, the MyControl™ function available from Sirius XM Radio, Inc. for personalizing its IP-streamed content can narrow a playlist (e.g., filter out songs) for a pre-defined channel based on user input. For example, the streamed channel can have a selected number of songs eliminated per hour which fail to meet channel-based user preferences that were indicated using a slide control on the IP-streaming media player. By contrast, the above described mix channel function (e.g., hereinafter referred to as "TuneMix™" from Sirius XM Radio, Inc., and is a broadcast-only feature versus an IP-streaming feature and is exemplified in US 2013/0003993 incorporated herein), expands a playlist by combining songs from multiple channels into a single TuneMix™ channel, and allows a user to skip songs that he/she does not like. In accordance with another illustrative embodiment of the present invention, a personalized mix channel feature (hereinafter referred to as "MyMix™" allows a user to apply customization filters as described above to channels and add customized playlists from multiple channels together into a single mix channel (e.g., that is transmitted via streaming or broadcast).

For example, a user with an IP connection to the programming center 20 or other provider of curated program channel content can create custom playlists from multiple channels that are then combined in a way that is fundamentally different and advantageous over the manner in which an on-line personalized radio service such as Pandora creates their custom channels. For example, the slider input provided by the MyControl function can be used to specify a user preference for a particular characteristic of program channels providing music from the 70s, 80s, and 90s such as songs that are "mostly Rock" (e.g., as opposed to ballads or acoustic songs) to create a MyMix channel that is "mostly Rock" of 70s, 80s, and 90s. In broadcast transmission content (e.g., versus IP streaming), the above-described metadata that is transmitted for songs in the source stream can provide content characteristics than can be correlated with selected user filter data to extract content from selected channels (e.g., a set channels for a selected genre or VDJ Favorite channels) that meets certain user characteristics to create a more personalized mix channel.

Thus, the above-described functions of (1) using user inputs during playback of a stream of curated content to generate filter data for a personalized radio channel playlist, (2) transmitting metadata for content segments in the source stream with which to compare with the filter data, and (3) extracting content segments from curated program channels based on the filter data to combine and playback to the user, provide for a system and method of constructing a custom playlist for listening (e.g., on-line or via an IP connection using a PC 46 or cellular phone or other device, or via a radio 14) by (a) providing a user with interface that can be used to define preferences on a global or per-channel basis (e.g., see FIGS. 6, 9, 10 and 11), (b) customizing the playlist for two or more channels by filtering out certain types of songs (e.g filtering out most of the Disco from a 70's channel playlist leaving mostly Rock songs) on the basis of information obtained from that interface, (c) combining the customized playlists from at least two of these customized channels (e.g., on-line channels) into a single playlist, such that songs from each channel are distributed throughout the playlist. The resulting playlist (e.g., a MyMix playlist) narrows content by filtering some types of songs and expands content by combining two or more narrow playlists.

Alternatively the channel playlists combined in step (c) above could be uncustomized (e.g., not filtered based on user-specified preferences via interfaces as shown in FIGS. 6 and 11), or can be a combination of playlists wherein some are customized and some are not. For example, a MyMix channel could be created by combining the unmodified 60's playlist and a modified 70's playlist with some or all disco songs filtered out. Unlike the broadcast transmission mode of the Tune Mix™ function, the IP-version of the MyMix™ function, for example, does not need to have additional content pre-buffered and available for instant skipping. Indeed, customizing the playlist prior to mixing the channels reduces the need or desire on the part of the user to skip songs, which is advantageous while listening over IP where every "skip" requires a break in the listening experience while content is buffered.

In accordance with another embodiment of the present invention, the broadcast and streaming modes are leveraged to transmit the content in the most cost effective manner. For example, the system and method of producing a customized listening experience can be performed using both a radio receiver 14 and an IP receiver (e.g., a PC 46 or cellular device) as shown in FIG. 6. For example, the radio 14 and integrated and/or separate IP receiver can be used to (a) provide a user with interface that can be used to define preferences on a global or per-channel basis. The IP receiver (e.g., PC 46) can (b) communicate those preferences to a central location (e.g. a data server 52) via an IP connection along with the identities of the channels in the user-defined TuneMix channel or channels. The data server 52 can (c) filter the playlists for those channels based on the user inputs to produce a narrower playlist for each channel, and (d) communicate a list of song IDs which should be skipped or a list which should be played preferentially to the hybrid satellite/IP receiver, or the separate but optionally tethered IP receiver, via an IP connection. The IP receiver, in turn, can (e) use that list of song IDs to filter the broadcast channels in real-time to produce a TuneMix™ channel which is more customized to the user's tastes (e.g., a MyMix™ channel) than a simple TuneMix™ channel that alternates content from the various component channels.

In contrast to the MyControl™ function, which streams actual content over an IP connected link and is therefore very expensive, the MyMix™ function need only send the playlist information over the IP link (i.e., very tiny bursts of data in comparison to the content). The content itself is instead delivered over the more economical broadcast path. In an alternative implementation, the hybrid IP/broadcast receiver can mix content streamed over IP occasionally (e.g., if the only choices available in the satellite broadcast buffer are clearly outside of the user's control preferences) if an IP connection is present at the time the additional content is required. In another alternative implementation, the hybrid IP/broadcast receiver can mix recorded content that was streamed from IP or recorded from the broadcast stream (e.g., see FIG. 21) if the only choices available in the satellite broadcast buffer are outside the user's control preferences. This implementation allows one or more songs meeting the user's preferences (e.g., supplemental content) to be stored on the radio 14 or associated memory and played (e.g., only when necessary and only when mixed in with other content as part of a MyMix channel and not under the control of the listener).

A personal radio channel is traditionally implemented as a unique audio stream of songs between a personal radio server and a personal radio client (i.e., a one-to-one connection and stream). Even though each stream is independently composed, when there are a large number of simultaneous clients (e.g., millions of clients), there is sometimes commonality of the songs across each personal radio channel such that, at any point in time or within any window of time, the same song may play on a relatively large subset of the personal radio channel streams. For example, for personal radio based on artist affinity, some artists are more popular than others and, therefore, many clients will select these same popular artists. When this occurs, an alternative implementation is to broadcast these coincident song(s) over a 1-way broadcast network (e.g., an SDARS service on overlay bandwidth) instead of streaming the song(s) over each one-to-one connection on the 2-way network. This may be more cost effective and bandwidth conserving for a bandwidth constrained 2-way network. The subset of personal radio clients are directed by the server 52 to receive, buffer and play the broadcast delivered song instead of a 2-way network delivered song (the 2-way stream is instead idle during this song period).

To increase the rate of incidence of coincident songs and also increase the corresponding number of coincident clients, the server 52 may evaluate all personal radio streams and intelligently modify and/or reorder the songs of some personal radio stream playlists, while maintaining some desired level of personalization quality of service (QoS). The server 52 can also optimize the rate of occurrence of coincident songs for the clients located in high density areas where the 2-way network is more bandwidth constrained (i.e., where there are more clients per 2-way network cell), so as to reduce 2-way network bandwidth strain in these areas. The server 52 can also evaluate the song content on the regular (non-personal) radio channels of the broadcast network. When a coincident song coincidentally occurs on a regular broadcast channel, the coincident clients are directed to buffer the song from this regular channel; therefore, there is no need to deliver the same song over the dedicated personal radio augmentation data service of the broadcast network. The server 52 can also evaluate the song content on the regular radio channels, including using look-ahead to future schedule of songs, to influence the personal radio stream content to further increase the incident rate of coincident songs delivered using the existing regular channel bandwidth. Furthermore, in an opposite direction, the server 52 can evaluate the playlists of the personal radio channel streams, and then influence the song content of the regular broadcast radio channels based on coincident songs of the personal radio channel streams. In a similar manner, for advertisement supported personal radio, the coincident advertisements may also be delivered over the broadcast network instead of each 2-way network one-to-one connection.

A radio receiver or user device 14 as described herein can be, for example and not limited to, a radio receiver (e.g., AM, FM, HD or SDARS receiver), a computer (e.g., a personal computer (PC), a laptop or other portable programmable computing device), a mobile phone, a smartphone, a tablet device, or a television (TV), among other user devices. It is to be understood that transmitted content as described herein is not limited to audio programming and can include video content, and multi-media content (e.g., one or more of audio, video, graphics, photographs, maps and so on), and that the program channels can include any assortment of music, news, talk radio, traffic/weather reports, comedy shows, live sports events, commercial announcements and advertisements, and so on.

The components of the illustrative devices, systems and methods employed in accordance with the illustrated embodiments of the present invention can be implemented, at least in part, in digital electronic circuitry, analog electronic circuitry, or in computer hardware, firmware, software, or in combinations of them. These components can be implemented, for example, as a computer program product such as a computer program, program code or computer instructions tangibly embodied in an information carrier, or in a machine-readable storage device, for execution by, or to control the operation of, data processing apparatus such as a programmable processor, a computer, or multiple computers. Examples of the computer-readable recording medium include, but are not limited to, read-only memory (ROM), random-access memory (RAM), CD-ROMs, magnetic tapes, floppy disks, optical data storage devices. It is envisioned that aspects of the present invention can be embodied as carrier waves (such as data transmission through the Internet via wired or wireless transmission paths). A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network. The computer-readable recording medium can also be distributed over network-coupled computer systems so that the computer-readable code is stored and executed in a distributed fashion. Also, functional programs, codes, and code segments for accomplishing the present invention can be easily construed as within the scope of the invention by programmers skilled in the art to which the present invention pertains. Method steps associated with the illustrative embodiments of the present invention can be performed by one or more programmable processors executing a computer program, code or instructions to perform functions (e.g., by operating on input data and/or generating an output). Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example, semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

The above-presented description and figures are intended by way of example only and are not intended to limit the present invention in any way except as set forth in the following claims. It is particularly noted that persons skilled in the art can readily combine the various technical aspects of the various elements of the various exemplary embodiments that have been described above in numerous other ways, all of which are considered to be within the scope of the invention.

What is claimed is:

1. A method of outputting selected content segments from one or more received streams comprising:
   receiving, at a receiver, at least one source stream comprising a plurality of multiplexed program channels, each of the program channels comprising content segments;
   receiving, at the receiver, metadata corresponding to the content segments in the source stream and representing attributes of the content segments;
   simultaneously buffering a designated plurality of the channels at the receiver;
   correlating the metadata of the content segments in the designated plurality of the channels with filter data indicating user preferences regarding the content segments in the source stream to select content segments in the buffered channels for playback; and
   generating an automatically mixed channel at the receiver by playing back the selected content segments in the buffered channels in a designated order;
   wherein generating the automatically mixed channel comprises playing back the selected content segments in at least one modified buffered channel and content segments from at least one unmodified buffered channel, wherein the modified buffered channel is filtered using the filter data and the unmodified buffered channel is not filtered using the filter data.

2. The method of claim 1, further comprising generating the filter data at the receiver using at least one of:
   the received metadata of content segments whose playback from the received source stream resulted in a user preference input at the receiver; and
   attribute preference controls provided by the receiver for at least some of the plurality of channels, wherein settings of the attribute preference controls correspond to respective content segment attributes.

3. The method of claim 2, wherein the settings and corresponding attributes of the attribute preference controls vary by channel.

4. The method of claim 2, wherein the user preference input indicates that, for at least one of the content segments in the source stream, the user likes or dislikes at least one of the content segment, the artist of the content segment, and the genre of the content segment.

5. The method of claim 1, wherein the source stream is broadcast, and further comprising:
   establishing a network connection to a server and transmitting the filter data to the server via the network connection, the server being configured to filter the content segments in the plurality of channels in the source stream and generate a list of content segment information corresponding to content segments in the source stream that should be skipped or played preferentially;
   receiving the content segment information from the server via the network connection; and
   generating the automatically mixed channel using content segments from the broadcast sources stream that are selected in accordance with the content segment information from the server.

6. The method of claim 1, further comprising:
   designating at least one virtual disk jockey (VDJ) that is characterized by at least one of a profile and content selections; and
   receiving, at the receiver, metadata indicating VDJ selections of recommended content segments from among the program channels transmitted in the source stream based on the at least one of a profile and content selections, the metadata indicating VDJ selections being transmitted to the receiver for reception in advance of the corresponding recommended content segments received in the source stream;

wherein generating the automatically mixed channel further comprises outputting the recommended content segments from the received source stream.

7. The method of claim 6, further comprising:

designating profile information unique to each of a plurality of VDJs, and selecting at least one of the VDJs;

wherein receiving metadata comprises receiving metadata indicating VDJ selections of recommended content segments from among the program channels by respective ones of the plurality of VDJs based on the at least one of a VDJ profile and content selections corresponding to that VDJ; and wherein outputting the recommended content segments from the received source stream based on the received metadata corresponding to the selected VDJ.

8. The method of claim 7, wherein the receiver comprises a user interface, and further comprising generating a listing of the plurality of VDJs by the user interface from which a user can indicate the selected VDJ.

9. The method of claim 7, wherein the metadata comprises metadata identifying each of the recommended content segments and metadata identifying which of the plurality of VDJs selected the recommended content segments.

10. The method of claim 6, wherein the outputting comprises at least one of:

automatically outputting the recommended content segments from the received source stream including tuning the receiver to the channels of respective ones of the recommended content segments of the selected VDJ when the segments are on a channel different from the currently tuned channel of the receiver; and generating an indication by the receiver that at least one of the recommended content segments of the selected VDJ will be received in the source stream and, in response to a user input, outputting the at least one of the recommended content segments including tuning to the corresponding channel if different from the currently tuned channel of the receiver.

11. The method of claim 10, wherein the metadata indicating VDJ selections of recommended content segments further comprises a score value that corresponds to at least one of the recommended content segments and indicates a rating of how strongly the VDJ likes the recommended content segment, and wherein the generating an indication further comprises indicating how much the VDJ likes the recommended content segment based on its score value.

12. The method of claim 11, wherein the generating an indication further comprises indicating that a plurality of the recommended content segments of the selected VDJ will be received in the source stream within a designated time period and indicating how much the VDJ likes respective recommended content segments based on their corresponding score values.

13. The method of claim 10, wherein the metadata indicating VDJ selections of recommended content segments further comprises a score value that corresponds to at least one of the recommended content segments and indicates a rating of how strongly the VDJ likes the recommended content segment, and wherein the automatically outputting the recommended content segments comprises outputting the recommended content segments received in the source stream when the score value satisfies a designated threshold.

14. The method of claim 6, further comprising buffering at the receiver at least the channels corresponding to the recommended content segments for a designated time period.

15. The method of claim 14, wherein the outputting comprises outputting the buffered recommended content segments based on their respective start times in the source stream.

16. The method of claim 14, further comprising at least one of:

dynamically allocating buffer resources to different channels corresponding to the recommended content segments; and simultaneously buffering a plurality of the channels that are designated by the selected VDJ.

17. The method of claim 16, further comprising outputting respective ones of the buffered recommended content segments from their beginnings.

* * * * *